Sept. 19, 1967 W. J. READING 3,342,012
EGG PACKER
Filed Feb. 12, 1964 14 Sheets-Sheet 1
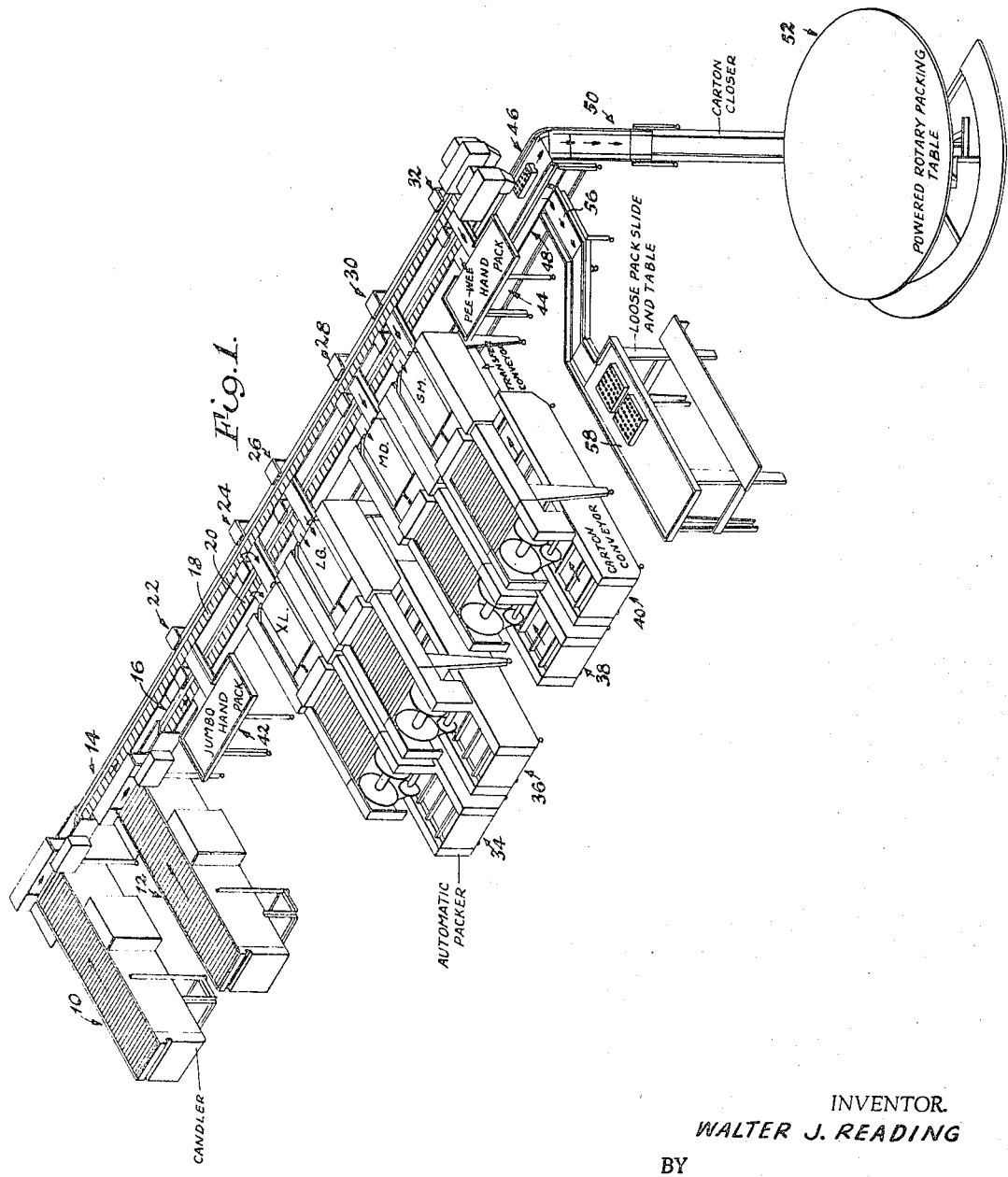
INVENTOR.
WALTER J. READING
BY
Bean, Brooks, Buckley + Bean
ATTORNEYS Sept. 19, 1967 W. J. READING 3,342,012
EGG PACKER
Filed Feb. 12, 1964 14 Sheets-Sheet 2
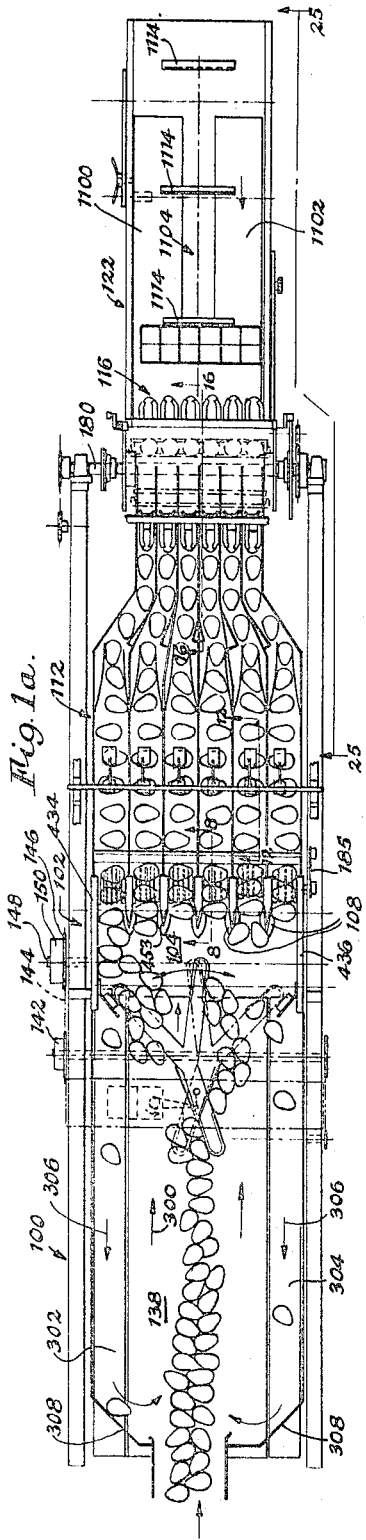
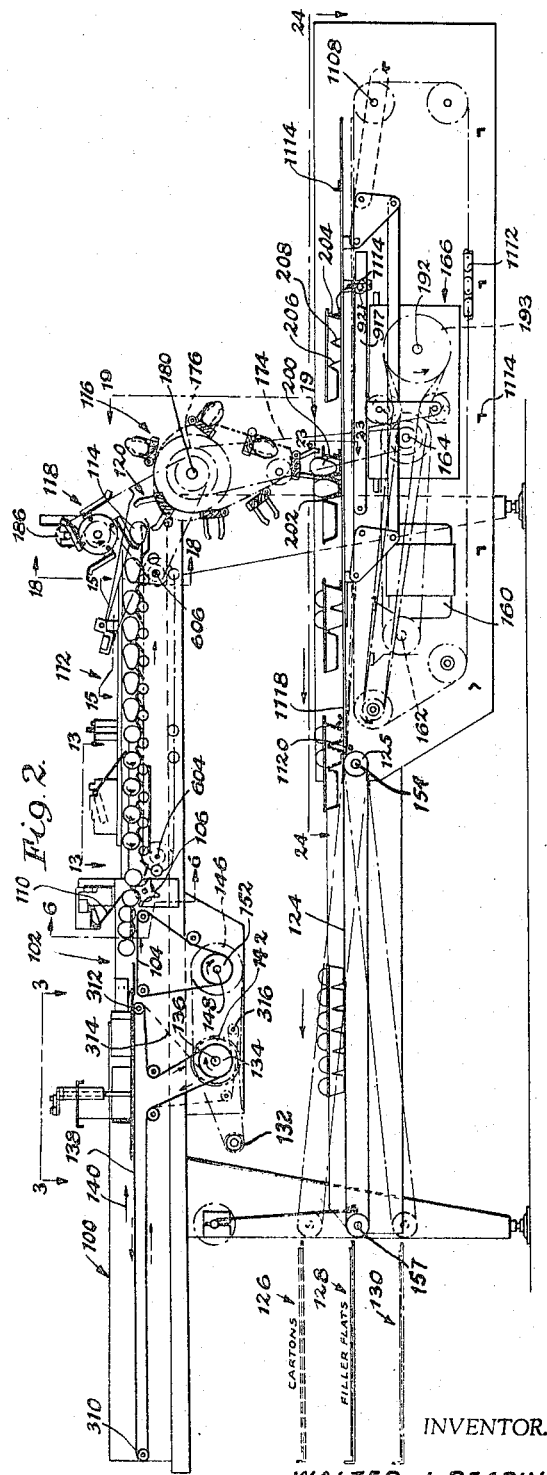
INVENTOR.
WALTER J. READING
BY
Bean, Brooks, Buckley & Bean
ATTORNEYS

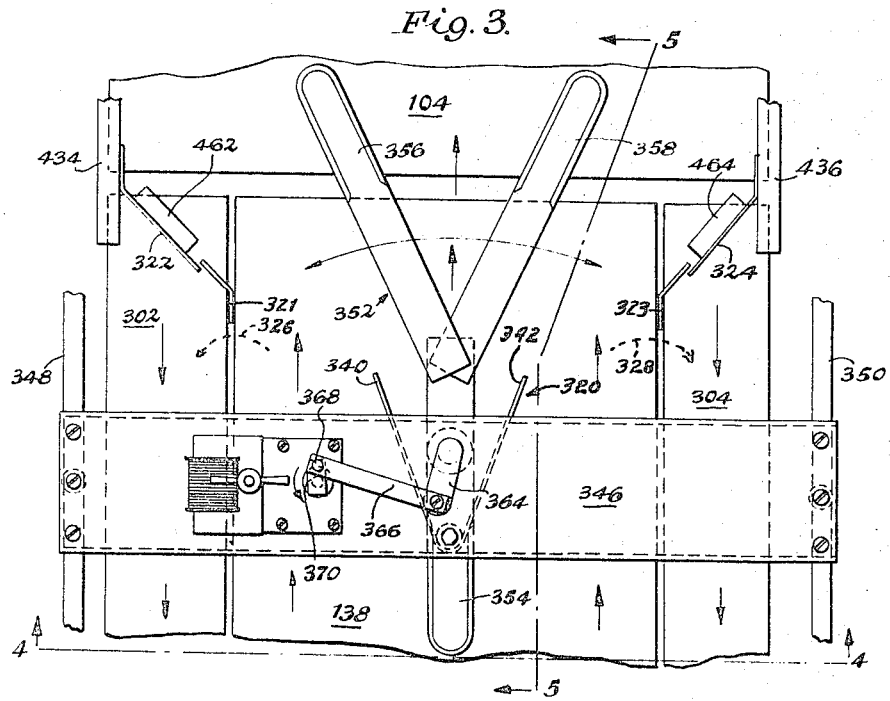
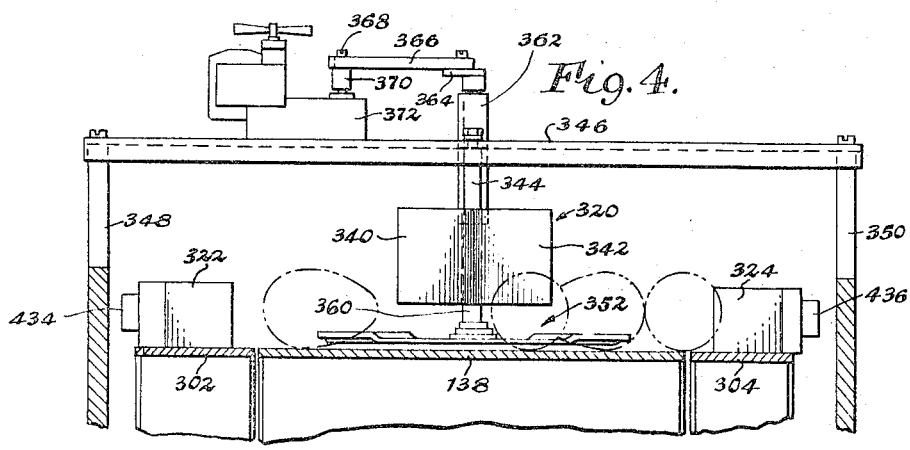
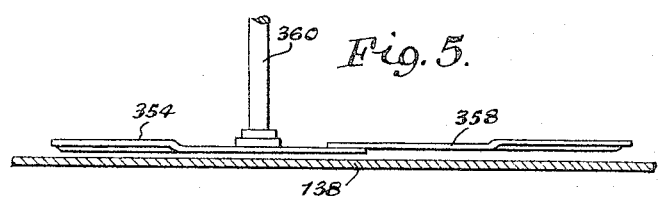

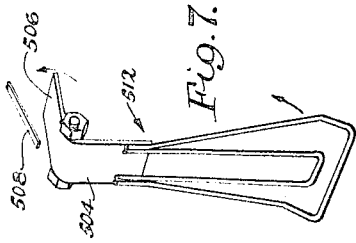
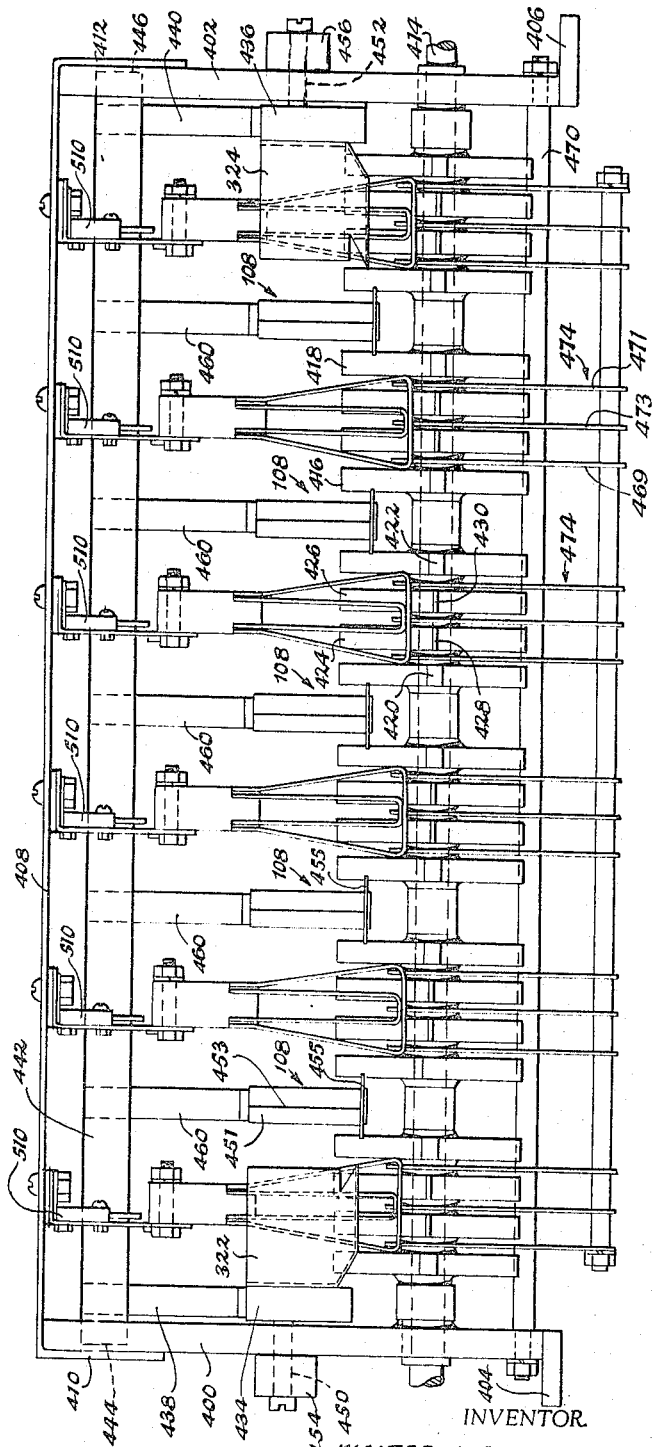

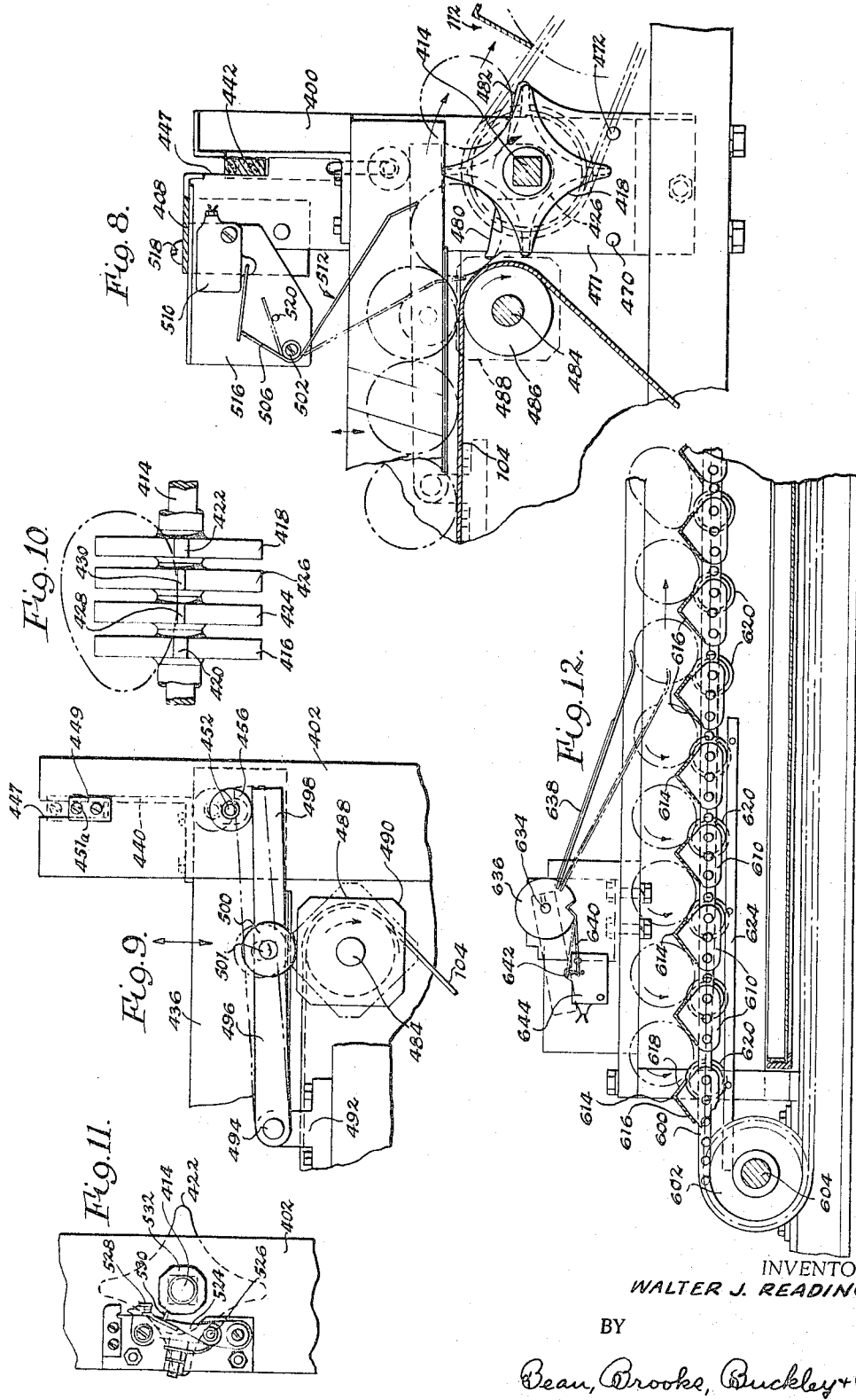

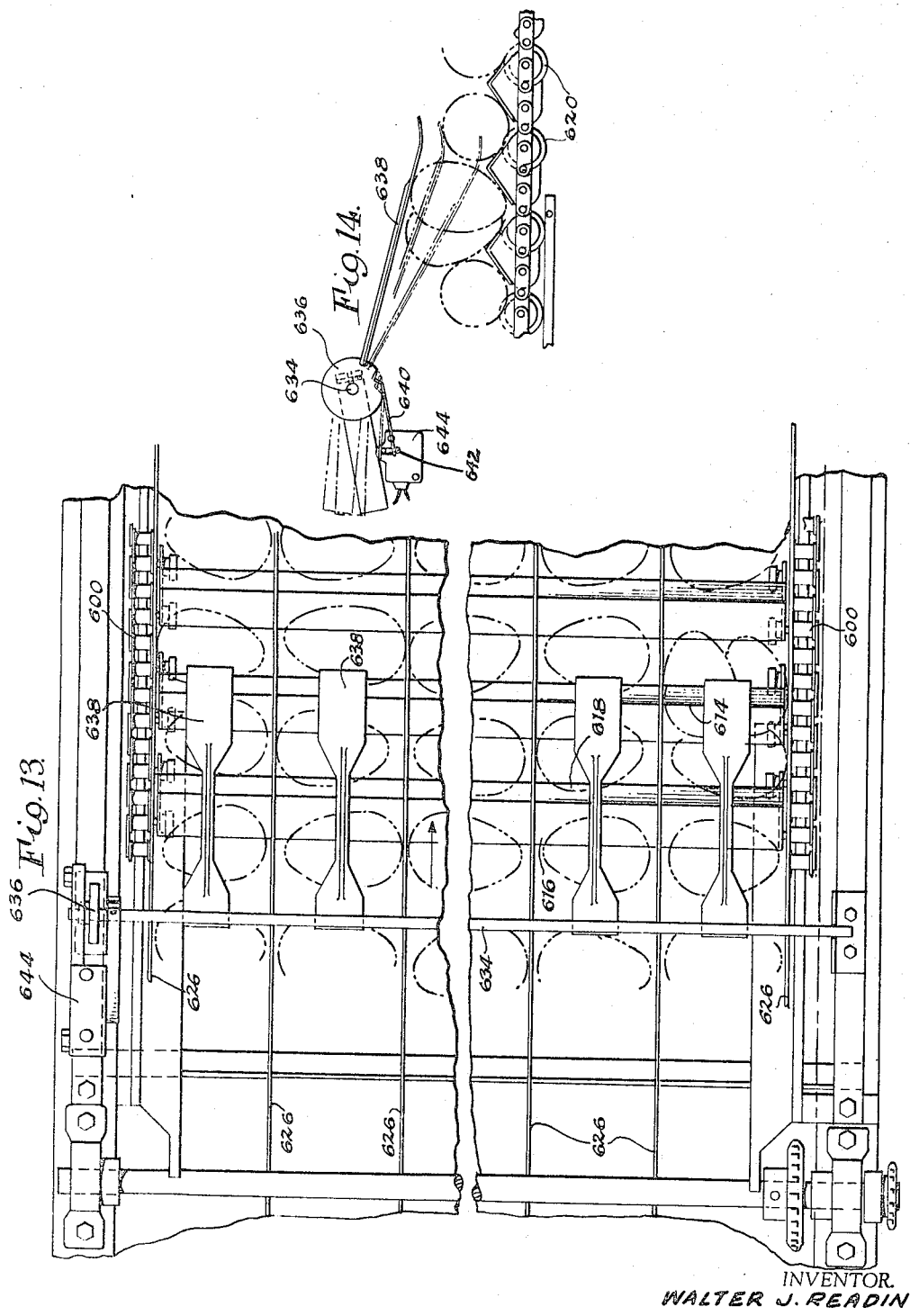

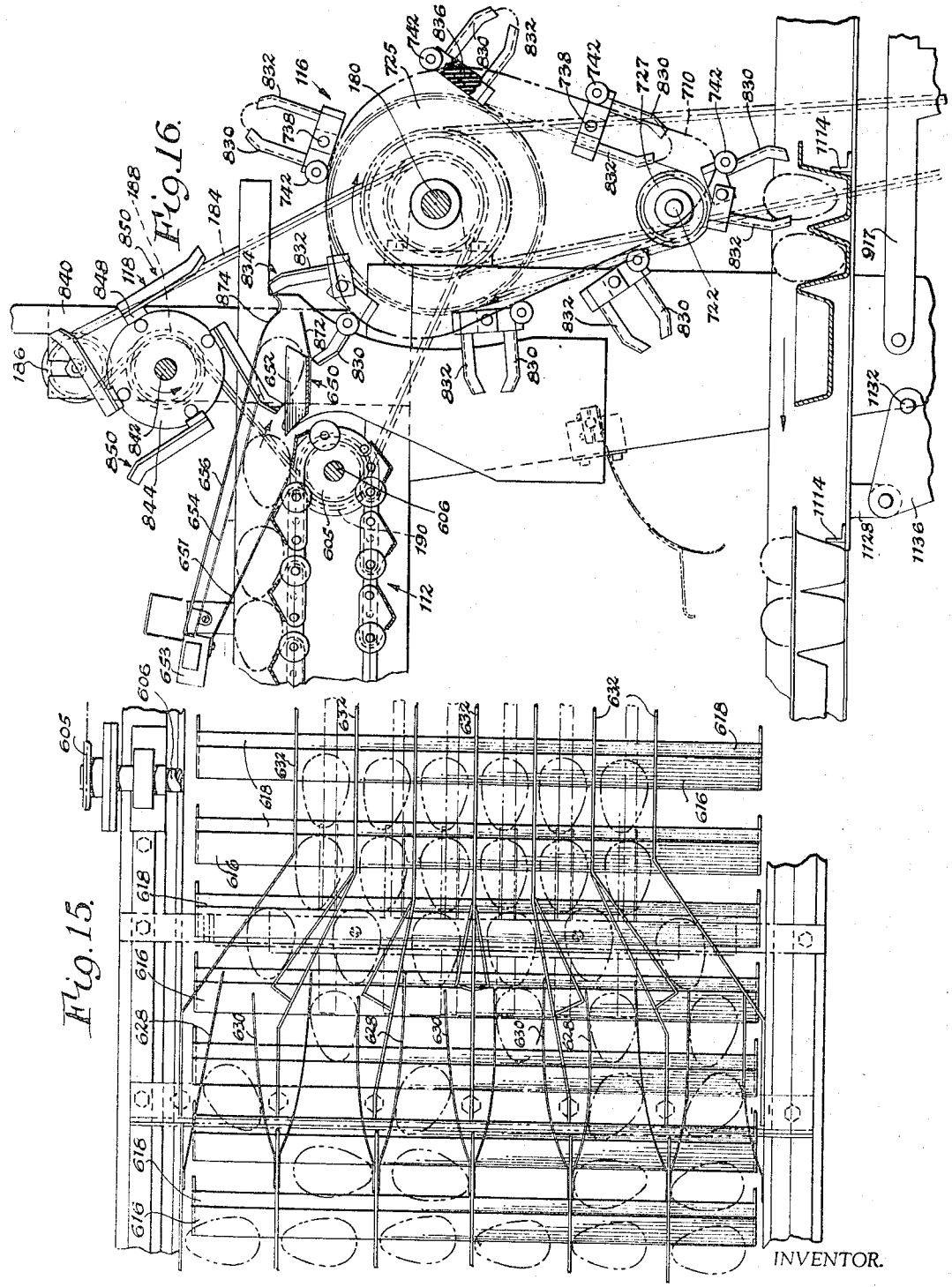

Sept. 19, 1967     W. J. READING     3,342,012
EGG PACKER
Filed Feb. 12, 1964     14 Sheets-Sheet 8
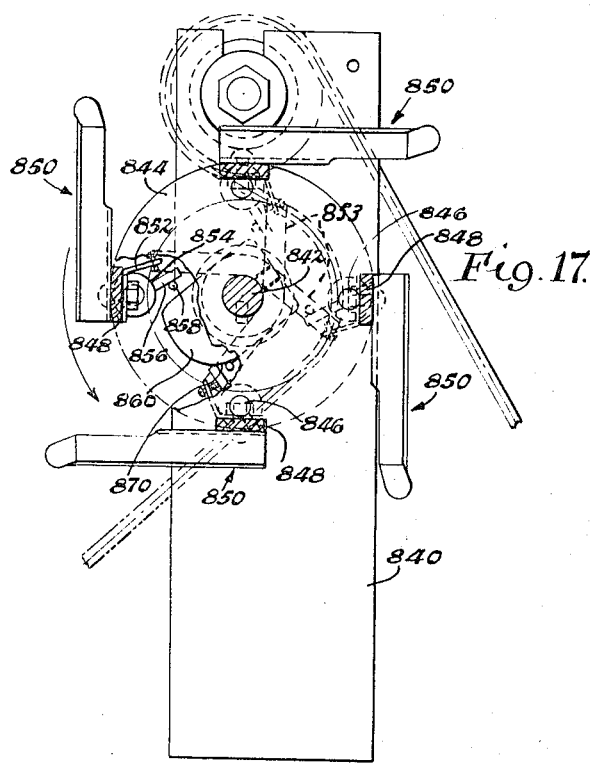
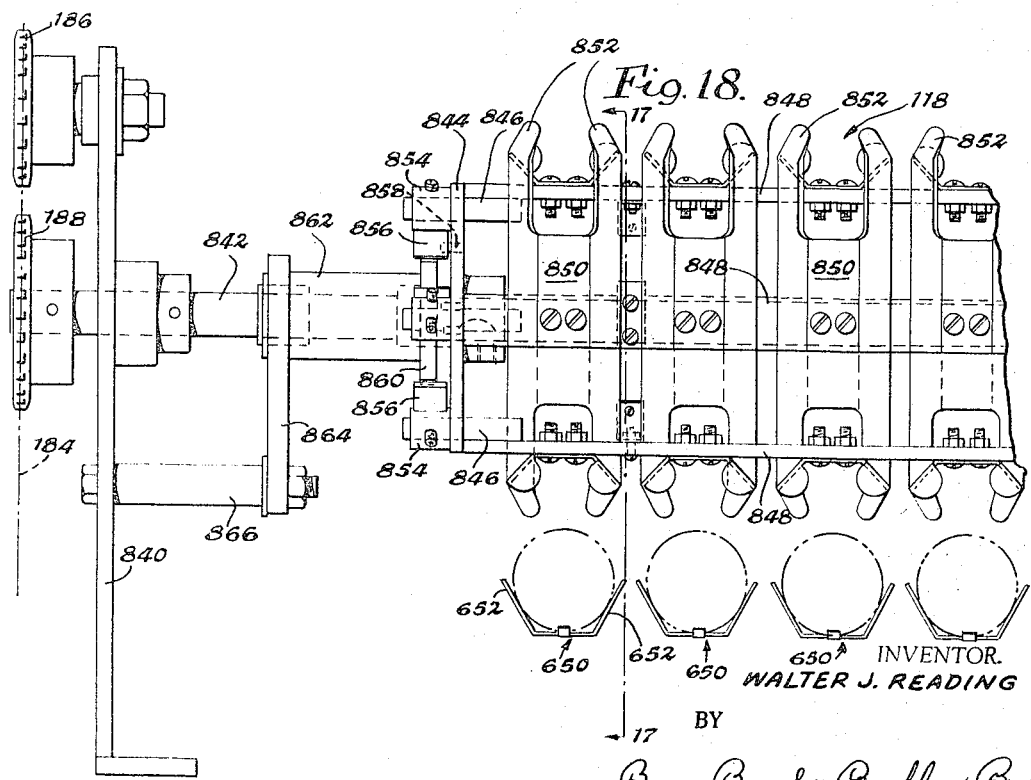
INVENTOR.
WALTER J. READING
BY
Bean, Brooks, Buckley & Bean
ATTORNEYS

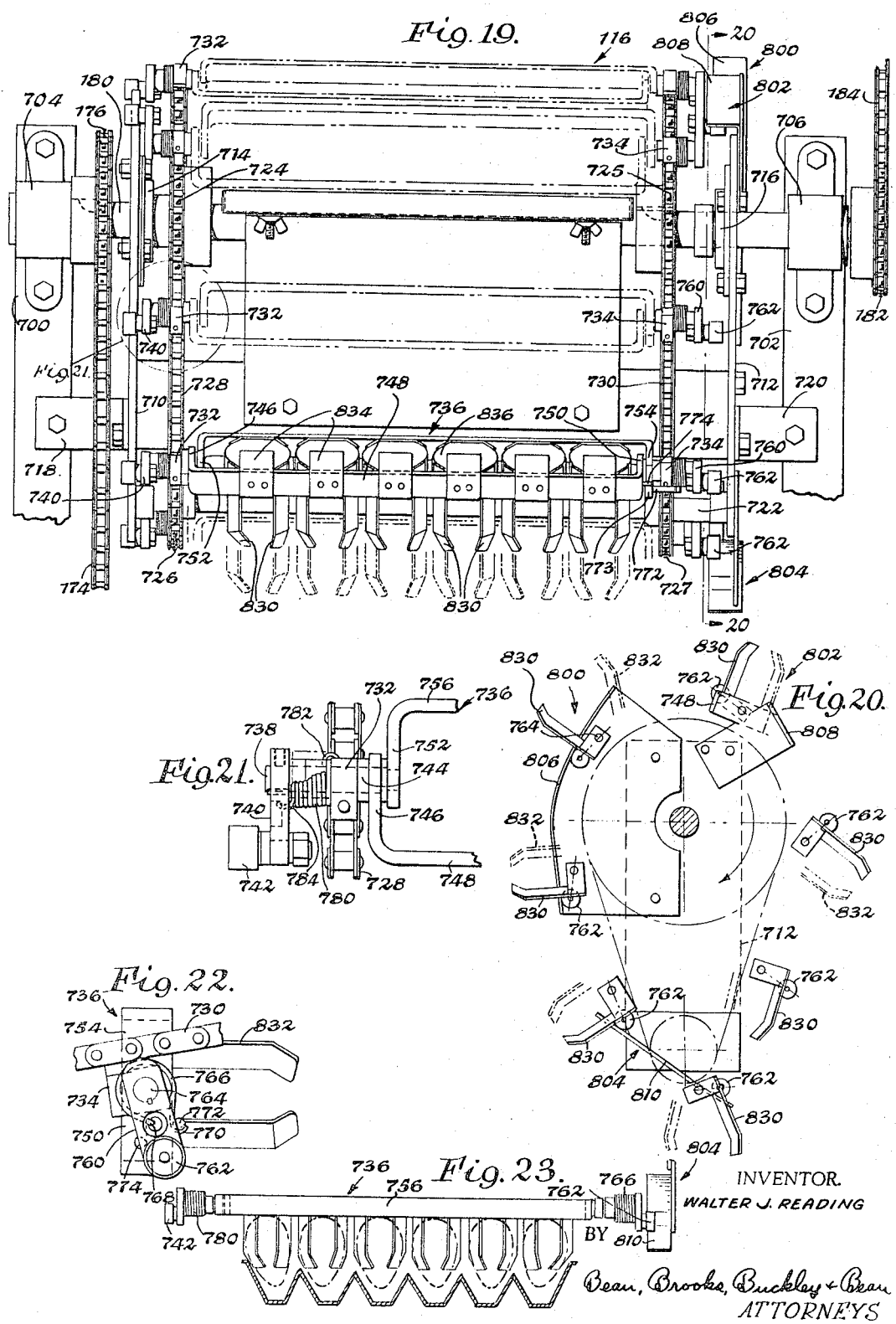

Sept. 19, 1967　　　　W. J. READING　　　　3,342,012
EGG PACKER
Filed Feb. 12, 1964　　　　　　　　　　14 Sheets-Sheet 11
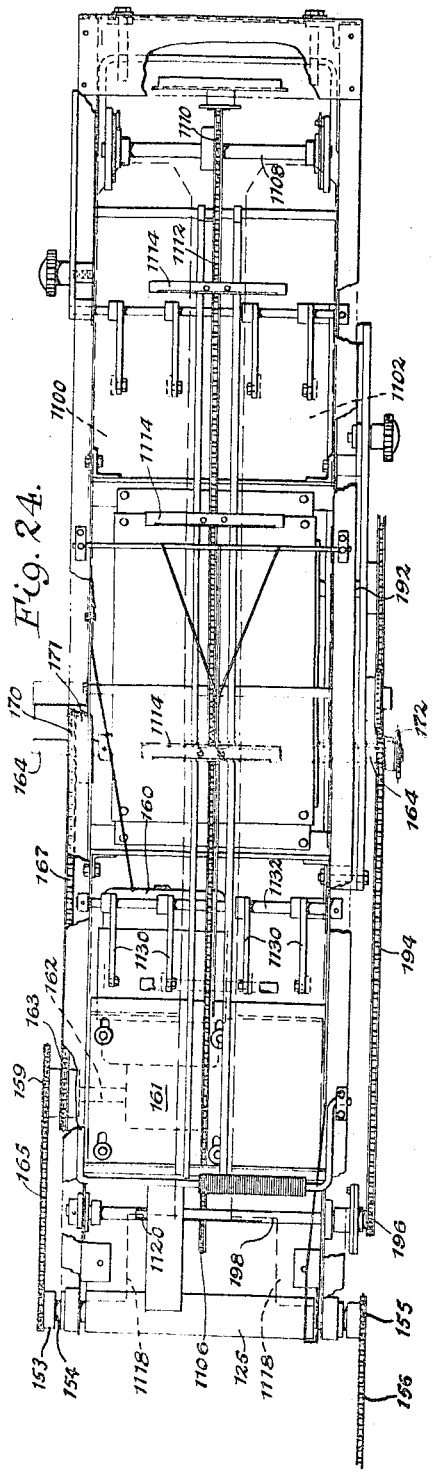
INVENTOR.
WALTER J. READING
BY
Bean, Brooks, Buckley + Bean
ATTORNEYS Sept. 19, 1967 W. J. READING 3,342,012
EGG PACKER
Filed Feb. 12, 1964 14 Sheets-Sheet 12

INVENTOR.
WALTER J. READING

BY

Bean, Brooks, Buckley & Bean
ATTORNEYS

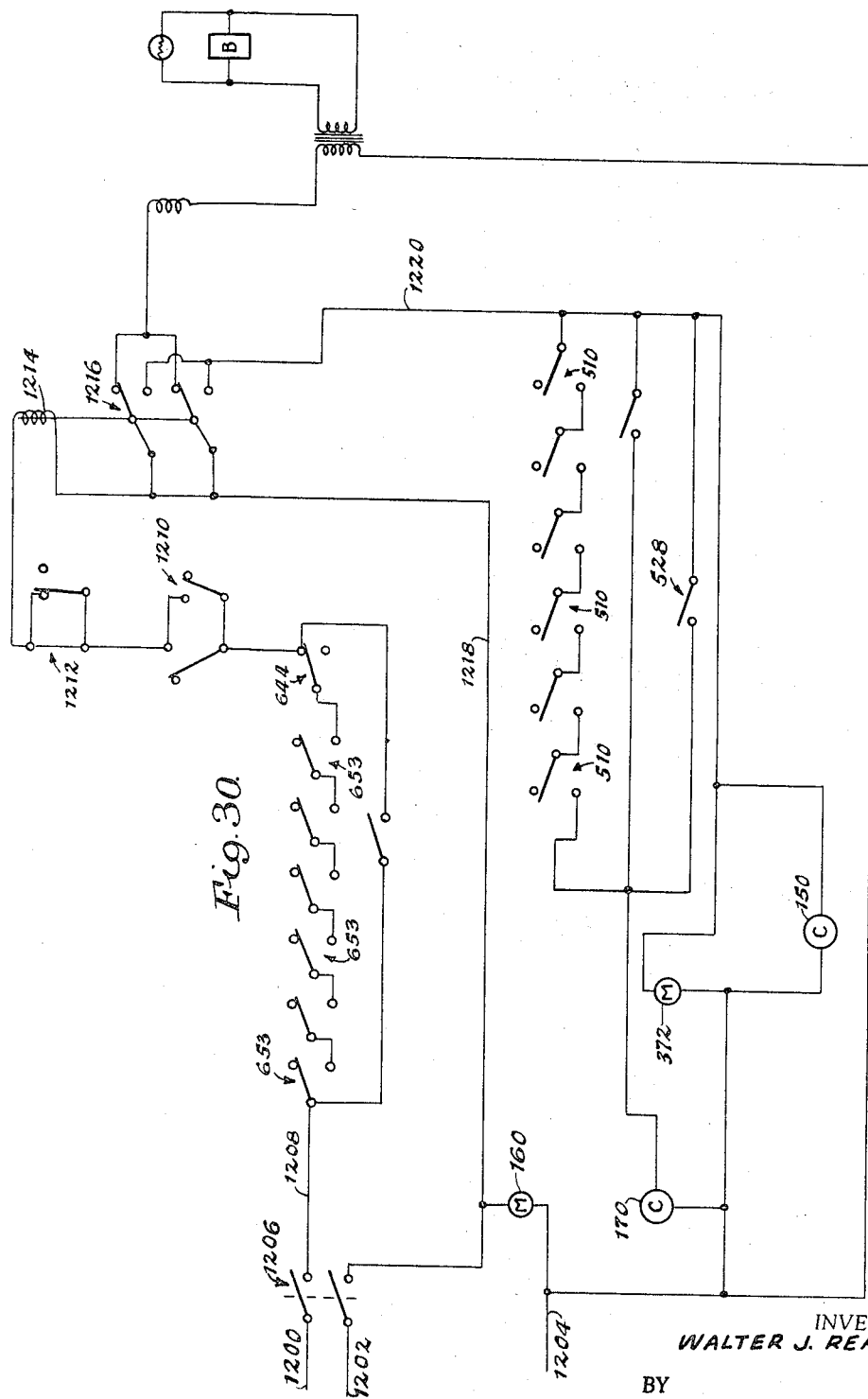

3,342,012
EGG PACKER
Walter J. Reading, Ottumwa, Iowa, assignor, by mesne
assignments, to Barker Poultry Equipment Company,
Ottumwa, Iowa, a corporation of Iowa
Filed Feb. 12, 1964, Ser. No. 344,285
41 Claims. (Cl. 53—62)

This invention relates to article handling machines and pertains, in particular, to an egg packing machine.

An egg processing arrangement will normally include an egg washing machine, a candler, grading mechanism for grading eggs by weight and an egg packer or packers for disposing the graded eggs into appropriate cartons or containers. The above machines will normally process the eggs in the order enumerated and, as might be expected, it is of extreme importance to establish a good degree of balance in such a system so that all machines or portions of the system are operating at or near maximum efficiency at all times. With the advent of improved egg candling machines, see my prior Patent 3,060,794, issued October 30, 1962, and improvements in weighing machines, as for example in my copending applications Serial No. 340,229, filed January 27, 1964, and Serial No. 61,585, filed October 20, 1960, which is a divsion of Serial No. 534,271, filed September 14, 1955, now Patent No. 2,961,087, it becomes possible to process eggs in a much more rapid rate than was heretofore possible. Thus, in order to realize the capabilities of these improvements, it is necessary also to provide an improved type of egg packing machine which is capable of handling a large volume of eggs so that the full capabilities of a system such as is set forth hereinabove may be realized.

It is, accordingly, of primary concern in connection with the present invention to provide certain improvements in article handling machines in which such improvements are specifically directed to, but not necessarily limited to, the packing of eggs.

In connection with the present invention, the egg packing machine as herein disclosed incorporates an accumulator means for receiving eggs in random fashion and for aligning them in transverse rows each containing a predetermined number of eggs and for advancing such rows when the number of eggs therein has been satisfied, orienting means receiving the rows of eggs from the accumulator means and operating to ultimately position the eggs all in one direction, packer means adapted to receive the rows of oriented eggs and to properly place them in containers supported or carried by a container conveyor mechanism located below the level of the input to the packer means. Due to the wide disparity in shapes and sizes of eggs even of the same grade, it is impossible from a practical standpoint to construct a machine which will handle eggs with absolute perfection. Thus, various and sundry abnormalities may occur, as for example two eggs may become "doubled" for a particular position in a row, an egg might be missing from a space in a row, the carton feeding, conveying and transporting means might function abnormally to omit a carton or container, to cause traffic pile-ups, or the like; any of which abnormalities must be guarded against so that the packing machine automatically stops under such conditions. Otherwise, the abnormality, if undetected, might easily cause serious damage to the eggs and/or machinery.

Accordingly, any egg packing machine will require certain safety devices for shutting the machine down at least momentarily until the abnormality can be corrected by a human operator tending the machine. When the packing machine is thus shut down, the infeed thereto will nevertheless continue at a rapid rate as permitted by the increased capacity of the aforementioned candling and grading mechanisms and it is therefore imperative that the packing machine be, first of all, of such construction as to minimize the possibility for momentary shutdowns as aforesaid and, second of all, to be of such capacity as to "catch up" with the infeed thereto under the circumstances of shutdown which, although minimized, are inevitable to a certain extent. At the same time, the question of increasing the capacity of an egg packing machine is not one merely of increasing the rate of drive speed thereto so that the parts function more rapidly than heretofore, since such a solution to the capacity problem immediately raises another problem ancillary to such speed up and which will rapidly become intolerable and overwhelming. Namely, the mere speeding up of the mechanism will immediately raise the linear velocities imparted to the eggs being handled and, as a result, the treatment or handling of the eggs becomes much "rougher" and there inevitably results a significant and intolerable increase in egg breakage. Thus, the problems basically involved in increasing the capacity of an egg packing machine are to minimize the linear speeds and velocities imparted to the eggs and avoid, in general, "rough" handling thereof and to, instead, provide a machine operating at a high density of eggs and with efficient mechanism which simplifies, as much as possible, the actual handling operations and permits the capacity or rate to be materially increased without increasing the danger of egg breakage.

It is, therefore, a further object of this invention to provide an improved egg grading machine wherein the general combinational relationship of component parts and the specific constructions thereof are such as to permit high speed or capacity operation while, at the same time, handling the eggs in a gentle fashion. In this manner, the entire system of handling, as aforesaid, may operate efficiently and rapidly to produce the desired end results.

Inherent in any system of the type as aforesaid wherein a packing machine is being continuously fed from a grading or sorting station, is the problem of accumulation in the event that the packing machine must be shut down as aforesaid. When handling delicate articles such as eggs, this poses a real problem inasmuch as a large mass of eggs which has thus been accumulated may be subjected to substantial feeding pressure which may result in "boiling up" spillage over the sides of the machine and/or general breakage within the confines of the accumulated mass. It is therefore a further object of this invention to provide an improved egg packing machine and ancillary infeed mechanism in which the infeed presents eggs to an accumulator means in which the combinational relationship existing therebetween is such as to limit the feed pressure of the eggs regardless of the quantity of eggs which may be backed up in the infeed mechanism due to disparity in handling rates as may be occasioned by any circumstance.

More specifically, the preceding object is realized by the provision of a recirculating type infeed mechanism operating in conjunction with an accumulator means at the fore part of the packing mechanism in which the combination is characterized by the deliberate recirculation of the articles whenever the accumulator means becomes filled. In general, this arrangement is characterized by the fact that the structural features present therein are such as to cause the eggs to be laterally deflected at the region of juncture between the infeed mechanism and the accumulator means so as to initiate the recirculation as aforesaid.

It is another object of this invention to provide an improved accumulator means in association with an egg packing device. In conjunction with this objective, it is to be realized that the act of accumulating randomly fed articles into a transverse row requires, if efficiency and speed of operation are to be at a maximum, that some mechanism be provided for assuring substantially uniform and constant feeding along the length of the transverse row. In conjunction with this problem, it is an objective of the present invention to provide an improved spreader means operating in conjunction with an infeed device and an accumulator means as aforesaid wherein the articles are substantially uniformly dispersed or presented along the transverse row so that the requisite number of eggs in a row at the accumulator means may be satisfied as quickly and efficiently as possible. Ancillary to this object is the provision of an improved gate mechanism for the reception of the transverse row of eggs in which the eggs are agitated or jostled in the immediate areas of the spaces defining the transverse row.

A further object of this invention is to provide an improved egg orienting device operating in combinational relationship with the mechanisms as aforesaid.

Another object of this invention is to provide an improved egg packing machine which includes a packer mechanism adapted to receive rows of oriented eggs and to lower them and deposit the same in suitable cartons therefor. In conjunction with this object, the improved packing mechanism is characterized by its gentle treatment of the eggs and its accurately timed coordination with the orienting means and with the mechanism which supports and conveys the containers for the eggs; and in which the packing means is further characterized by the fact that it is so constructed and arranged as to inherently provide the capability for handling a large volume of eggs at a rapid rate without sacrificing gentle treatment thereof. Moreover, the packing means in accordance with the present invention is positive and safe in its operation, it minimizes impact on the eggs incidental to the transferring and depositing operations and, further, minimizes the linear rate at which the eggs must be transported.

Another object of this invention resides in the system concept peculiar to the packer machine disclosed herein. Insofar as this system concept is concerned, the same is directed to the combination of the aforementioned infeed mechanism, the accumulator means, the orienting means, the packer means and a carton or container conveyor mechanism, all operating in synchronous and timed relationship to permit a maximum capacity to be realized. In this connection, the accumulator means incorporates a star wheel device which is adapted to receive a transverse row of eggs and which is operated to advance such row of eggs only when the spaces in the transverse row have all been satisfied. Meanwhile, the infeed mechanism and a conveyor forming a part of the accumulator means and feeding the star wheel device are constantly operating in an attempt to bring the completion of a row to fruition. Once a row has been satisfied and the star wheel device is actuated, the orientor, packing means and carton conveying mechanism are "stepped" ahead to advance the progress of rows of eggs which have been passed by the accumulator means. Further, the system incorporates safety means whereby the operation of all mechanisms with the infeed mechanism is ceased in the advent of an abnormality as aforesaid. Thus, the orientor means, the packer means and the carton conveyor means are controlled in two fashions, one in response to satisfaction of a row of eggs in the star wheel device and, secondly, in response to the absence or presence of abnormalities in the machine as aforesaid. Therefore, it is possible in accordance with the present system to poerate the container conveyor means, the packer means, the orientor means and that portion of the accumulator means at the star wheel device from a common drive source therefor. This greatly simplifies the entire system and, furthermore, assures the capability for exact synchronous and timed relationship of the various entities involved.

Ancillary to the preceding object is the provision of an improved drive or transmission mechanism for devices of the nature specified. Specifically, the improved drive according to the present invention incorporates a transmission mechanism which is capable of imparting a fixed drive speed to the packer, orientor and star wheel device while simultaneously providing a cyclically variable drive to the carton conveyor mechanism as will be required and necessitated by the physical constructions of the cartons or containers and the fact that they will be spaced apart on the container conveyor mechanism.

Other objects and advantages of the invention will appear from the description hereinbelow and the accompanying drawings wherein:

FIG. 1 is a perspective view showing a system for candling, grading and packing eggs, and illustrates the manner in which the improved grader according to this invention permits of increased efficiency;

FIG. 1a is a top plan view of the grader according to this invention;

FIG. 2 is a side elevational view of the assembly shown in FIG. 1a;

FIG. 3 is a plan view as indicated in FIG. 2 showing the discharge end of the infeed conveyor and the spreader and feed pressure-limiting means;

FIG. 4 is a vertical section taken along section line 4—4 in FIG. 3;

FIG. 5 is a side view of the spreader;

FIG. 6 is an elevation view, looking in the direction of egg movement as indicated by section line 6—6 in FIG. 2, of the star wheel frame and the parts supported and/or guided thereby;

FIG. 7 is an enlarged perspective of one of the switches controlling operation of the star wheel device;

FIG. 8 is an enlarged vertical section taken along section line 8—8 in FIG. 1a and showing details of the accumulation means;

FIG. 9 is a view similar to FIG. 8 but showing the side of the assembly of FIG. 6;

FIG. 10 is an elevation illustrating one group of star wheels;

FIG. 11 is a view showing a lower portion of the star wheel frame of FIG. 9;

FIG. 12 is an enlarged vertical section taken along section line 12—12 in FIG. 1a and showing the intake end of the orientor means;

FIG. 13 is a plan view, as indicated by section line 13—13 in FIG. 2, showing details of the orientor means;

FIG. 14 is a partial view illustrating operation of a doubled egg detector switch;

FIG. 15 is a plan view as indicated by section line 15—15 in FIG. 2 illustrating the orientor means adjacent the discharge end thereof;

FIG. 16 is an enlarged vertical section taken through the packer means and transport device as indicated by section line 16—16 in FIG. 1a;

FIG. 17 is a vertical section taken through the transport device, as indicated by section line 17—17 in FIG. 18;

FIG. 18 is an enlarged elevation of the transport device as indicated by section line 18—18 in FIG. 2;

FIG. 19 is an elevation view of the packer means looking in the direction as indicated by section line 19—19 in FIG. 2;

FIG. 20 is a diagrammatic view looking at the cam assembly at one side of the packer means, as indicated by section line 20—20 in FIG. 19;

FIG. 21 is a view showing an end portion of a packer means frame assembly cooperable with the cam assembly of FIG. 20a;

FIG. 22 is an end view of a packer means frame assembly cooperable with the cam assembly of FIG. 20;

FIG. 23 is a view illustrating a packer means frame positioned to deposit a row of eggs in a container as indicated by section line 23—23 in FIG. 2;

FIG. 24 is an enlarged plan view of the container conveyor means, as indicated by section line 24—24 in FIG. 2;

FIG. 25 is an enlarged side elevation of the container conveyor means as indicated by section line 25—25 in FIG. 1a;

FIG. 30 is a circuit diagram illustrating the relation of the drive components.

Figure 20A:
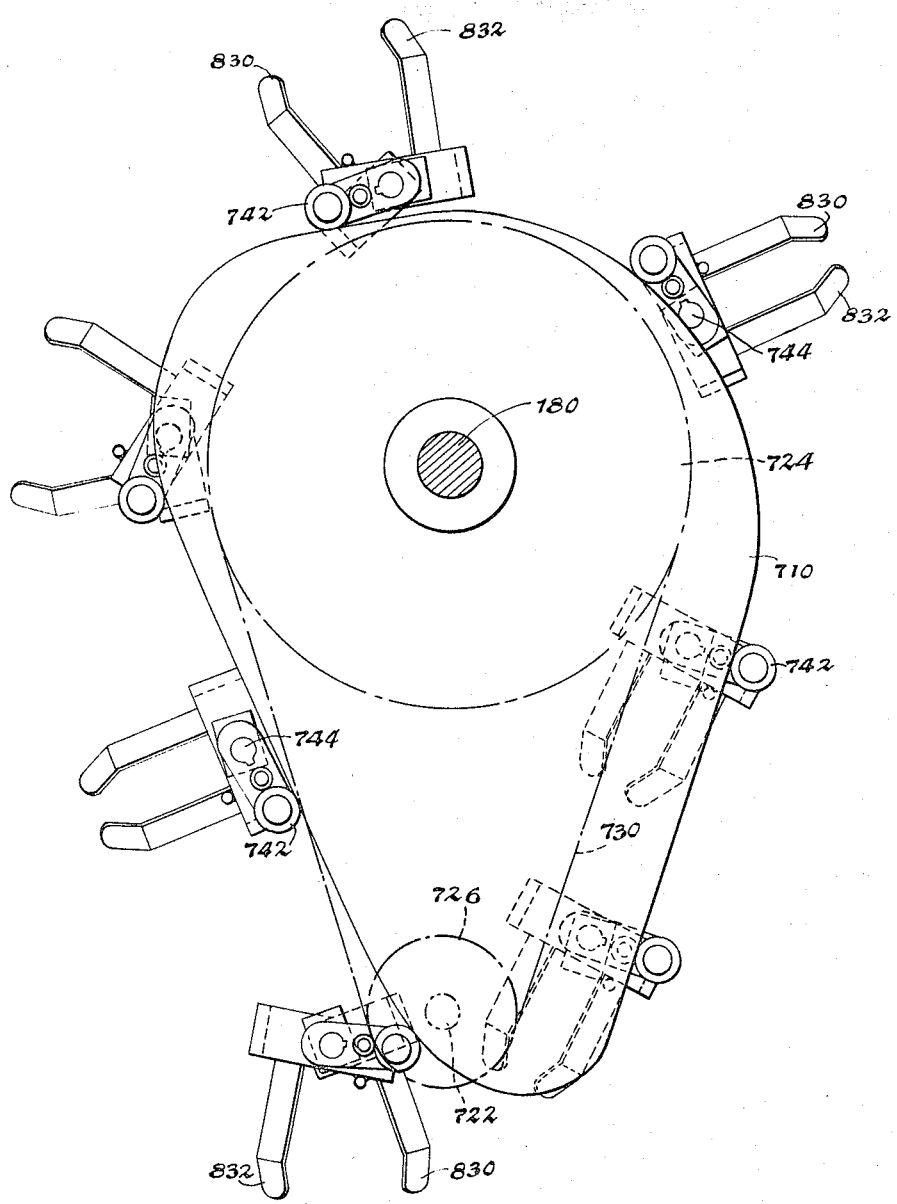
FIG. 20a is a view similar to FIG. 20 but showing the cam assembly at the other side of the packer means.

Referring at this time to FIG. 1, an egg processing assembly is illustrated largely diagrammatically therein. The input to the system may be from washing mechanisms which are not shown in the figure but which will discharge eggs, properly cleansed, to the candler mechanism indicated generally by the reference characters 10 and 12. These candlers may be constructed, for example, in accordance with my prior Patent 3,060,794, issued October 30, 1962. The eggs which are passed through the candling mechanisms are ultimately discharged to the grading mechanisms, an upper one of which is indicated generally by the reference character 14 as fed by the candler 10 and a lower one of which is indicated generally by the reference character 16 as fed by the candler 12. These grading machines may be constructed, for example, in accordance with my prior Patent 2,961,087, issued November 22, 1960. The eggs are transported along the upper flights 18 and 20 of the two grading mechanisms and sequentially pass the various grading stations 22, 24, 26, 28, 30 and 32. These stations may be characterized by the presence of weighing mechanisms as for example that described in my copending application Serial No. 340,229, filed January 27, 1964, to operate the deflecting means of the aforesaid Patent 2,961,087 to laterally deflect eggs corresponding in weight to the grade involved onto the ramps or conveyor means leading to one of the several packing machines 34, 36, 38 and 40 or to the jumbo hand pack station 42 or the peewee hand pack station 44, substantially as is shown. It will be understood that the packer 34 is for handling extra large eggs, the packer 36 for large eggs, the packer 38 for medium eggs and the packer 40 for small eggs, although it will be also understood that other and different grading arrangements may be utilized, as may be desired.

In a manner hereinafter more particularly pointed out, the graded eggs which are fed randomly to the packing machines are arranged thereby into transverse rows, oriented and then placed in proper pockets or receptacle portions of suitable containers or cartons. Each of the packers discharges either to a carton main conveyor indicated generally by the reference character 46 or to a filler flat main conveyor indicated generally by the reference character 48. Thus, any of the packing machines may be set to handle cartons or filler flats or other containers as may be desired and two or more main conveyors are provided to accommodate such different types of containers. Ordinarily, however, only cartons containing one dozen eggs and filler flats containing two and one-half dozen eggs need be considered and provision for these two types of containers are shown in FIG. 1. Thus, the main conveyor 46 is adapted to receive filled one dozen egg containers from the various packers whereas the main conveyor 48 is adapted to receive filler flats which may be discharged from one or more of these packers. The main conveyor 46 ultimately discharges to a chute conveyor mechanism 50 whereupon the cartons are closed and ultimately discharged onto a rotating table mechanism 52 whereat the filled cartons are loaded into containers such as cases or the like or otherwise disposed of by operators positioned about such table. Likewise, the filler flats are discharged onto the conveyor 56 and up to a table mechanism 58 for disposal by operators at this station. It will also be understood that the automatic packers 34, 36, 38 and 40, according to this invention, are provided with carton or container feeding means (not shown) which dispense the containers thereto and which are subsequently filled by the action of the packing means.

As will be clear from FIG. 1, it is of utmost importance that a system such as is shown be so constructed that at least some of the component parts thereof are operative independently so as to obviate complete shutdown of the entire system in the presence of abnormality in any particular component. For example, if any of the traffic system, i.e., the main conveyors or feeder lines thereto become jammed, it would be detrimental to maximum efficiency to cease operation of the grading mechanisms and/or the candlers or the infeeds to the candlers merely because of such a traffic jam, but, instead, it would be necessary only to cease operation of the various packers and of the traffic conveying mechanism so as to permit the abnormality to be cleared up and permit resumption of operation. It would of course be possible to cease operation of the entire machine under such a circumstance but, on the other hand, it is obvious that such an operation would severely limit the over-all capacity of the system. Instead, it is extremely desirable to permit the candler and the grading mechanism and the traffic control system as well to operate completely independently of the packing mechanisms. However, this necessitates the packing machines to be capable of a maximum capacity which is substantially greater than that which would be required if the entire system were shut down due to abnormality at any point therein. That is to say, if the grading devices continue feeding the egg packers even when the same are shut down, albeit only momentarily, it is obvious that the packers must be of sufficient capacity to "catch up" so to speak so that the possibility of successive momentary shutdowns will not so overload the packers as to require cessation of the operation of the rest of the system.

Although this is a very desirable feature, it is not a completely simple matter in that the answer does not reside in the mere speeding up of the operation of the packers inasmuch as prior art designs are of such nature as to introduce such an inordinate amount of egg breakage incidental to operation above the designed speed that this solution tends to be impractical. Instead, it is necessary to provide the packing machines with capability for accumulating a substantial mass of eggs as may be occasioned by momentary shutdowns of the packers while still retaining the capability of quickly and rapidly deposing such an accumulation once the machine is operating again and to do so without subjecting the eggs to such rough treatment as would increase the amount of egg breakage which may be expected incidental to the use of automatic equipment.

GENERAL DESCRIPTION OF THE PACKING MACHINE

With reference now to FIGS. 1a and 2, the packing machine according to the present invention is illustrated therein. The essential parts of this machine are, first, the infeed conveyor mechanism which is indicated generally by the reference character 100 and which is adapted to receive eggs from any source, as for example the grading chutes according to FIG. 1 and which is characterized by feeding these articles to the right, predominantly, in FIG. 2, toward the accumulator means which is indicated generally by the reference character 102 therein. The accumulator means 102 includes a conveyor mechanism 104, a star wheel mechanism 106, plow means 108, see particularly FIG. 1a, and switch means 110 for controlling the star wheel means in a manner hereinafter more fully disclosed. The operation up to this point in the machine is that the infeed conveyor 100 feeds the eggs to the accumulator belt 104 and the accumulator belt 104 in turn feeds the articles to the star wheel mechanism 106. The star wheel mechanism presents a series of transversely spaced pocket or receptacles for receiving the articles and when all of such pockets are filled, the star wheel mechanism is operated to advance such row of articles onto the orientor device indicated generally by the reference character 112.

After passing through the orientor means 112, a row of oriented eggs such as the row 114 shown in FIG. 2 are poised and ready to be advanced to the packer means indicated generally by the reference character 116. The advancing mechanism or gate means 118 performs the function of advancing the poised row 114 for reception into the next row of baskets or cages 120, a plurality of which are mounted on the packer means 116, substantially as is shown. Disposed below the packer means 116 is a container conveyor mechanism indicated generally by the reference character 122 and which is adapted to receive cartons or containers from the right-hand side thereof as shown in FIGS. 1a and 2 and advance these containers to positions in registry below the packer means 116 for the reception of rows of eggs as will be readilly apparent.

The filled containers, after leaving the carton conveying mechanism 122, are applied to a transfer conveyor mechanism indicated generally by the reference character 124 and which is positionable to discharge onto one or more of the main conveyors such as those indicated by the reference characters 126, 128 and 130 in FIG. 2.

GENERAL DESCRIPTION OF THE DRIVE MECHANISM

A particular feature of the present invention is the manner in which the drive is imparted to the various and sundry components of the mechanism in an integrated fashion so as to produce an efficient arrangement and operation, In the first place, it is to be understood that the infeed conveyor mechanism 100 is substantially continuously operated, that is in the sense that it is completely independent of the operation of the remainder of the packer mechanism. For this purpose, a suitable motor such as that indicated by the reference character 132 in FIG. 2 is provided to drive the infeed conveyor 100 continuously. This motor is provided with a roller or suitable mechanism 134 mounted on its shaft 136 and over which the main belt 138 of the infeed conveyor is trained so that the top flight of this belt upon which the eggs are supported moves in the direction as indicated by the arrow 140 in FIG. 2. One end of shaft 136 which carries the roller 134 projects laterally from the frame of the machine and is provided thereon with a sprocket such as that indicated by the reference character 142 which is engaged by the chain 144. The chain 144 passes over a sprocket 146 which is journalled upon and selectively coupled with a shaft 148 through the medium of a clutch device 150, which may be a magnetic clutch or the equivalent for selectively driving the accumulator conveyor 104. The shaft 148, as can be seen in FIG. 2, fixes a drum 152 thereon over which the previously mentioned accumulator conveyor belt 104 is trained, substantially as is shown. Thus, so long as the motor 132 is operating to drive the infeed conveyor 100, and the clutch 150 is engaged, the shaft 148 will turn and the accumulator belt 104 will also operate.

The remainder of the components of the machine are operated by a single motor 160 shown in the lower right of FIG. 2 and in FIGS 24 and 25 and which operates through a suitable gear head 161 to rotate a shaft 162 which has a pair of sprockets 159 and 163 fixed thereto. The chain 165 drives the sprocket 153 fixed to an idler shaft 154 upon which the drum 125 of the transfer conveyor assembly 124 is journalled whereas the chain 167 drives the main shaft 164 of a transmission device indicated generally by the reference character 166. The idler shaft 154 is provided with a further sprocket 155 (FIG. 24) which engages a chain 156 which is crossed over itself and drives the main drive shaft 157 (FIG. 2) of the transfer conveyor assembly 124. In addition to the chain 167 and sprocket 170 by means of which the main shaft 164 derives drive from the motor 160, the main shaft 164 is also provided with a sprocket 172 which, through a chain member 174, trains over a sprocket 176 on the packer means 116 (FIGS. 2 and 19) to rotate the packer main shaft 180. The shaft 180 also carries a sprocket 182 driving a chain 184 trained over a suitable idler sprocket 186 and engaged thereafter over a sprocket 188 (FIGS. 2, 18 and 19) for driving the advancing means 118 and thence extending to pass over the sprocket 190 which drives the orientor device 112 (FIG. 16). The star wheel device 106 is driven, in turn, from the orientor means 112, as by the chain 185 as shown in FIG. 1a. Thus, the packer means 116, the advancing means 118, the orientor means 112 and the star wheel device 106 are driven in common from the transmission shaft 164.

The transmission assembly 166 also includes a second output shaft 192 which is provided with a sprocket 193 and drives, through the chain 194, a sprocket 196 fixed to the shaft 198 for driving the carton conveyor mechanism 122 (FIG. 25).

It is a particular feature of this invention that the transmission mechanism 166 is adapted to drive the main shaft 164 thereof at a fixed rotational speed while driving the secondary shaft 192 thereof at different speeds, as necessitated by the character of the containers supported by the container conveyor 122 and moved thereby. Thus, referring to FIG. 2, the row of eggs exemplified by the egg 200 is shown being deposited in the carton 202, and more specifically in the second row of such carton. The next carton 204 is supported by the conveyor mechanism in spaced relation to the carton 202 which precedes it and, thus, the carton conveyor must be moved through a distance such as to correspond to the distance between the second row of pockets in the container 202 to the first row of pockets 206 in the container 204 and then the next movement must be the short distance to the next pocket 208 of the carton 204 and so forth. Thus, the carton conveyor must be capable of moving the cartons alternately short and long distances within the same space of time and, as will hereinafter appear in connection with the specific construction of the transmission mechanism, the details of the internal construction of the transmission mechanism 166 are such as to provide for this movement. Additionally, as will also hereinafter appear, the transmission mechanism is so constructed as to also accommodate for different types of cartons, and specifically, for so-called filler flats. These filler flats contain thirty eggs in total in five rows of six each. Thus, when the carton conveyor is utilized to convey filler flats, its movement must be one long movement followed by four short movements and then another long movement, etc., with each of the movements being accomplished within the same period of time in order to obtain synchronism and proper timed relationship with the operation of the packer means 116.

As will also hereinafter appear, the star wheel, assembly 106 controls the operation of the orientor 112, the advancing means 118, the packer means 116, and the carton conveyor 122. The manner in which this is accomplished is by the switches 110 described in conjunction with FIG. 2 wherein the star wheel mechanism 106 is rotated only in response to a condition in which all of the pockets thereon are filled by eggs. When this condition prevails, the star wheel mechanism will rotate a quarter of a turn to advance a row of eggs and at the same time, the orientor will be stepped ahead one row as will be the means 118, 116 and the carton conveyor mechanism 122 will be correspondingly indexed to a new position as aforesaid. Thus, the motion of the machine may be intermittent, that is step-by-step but, in actuality, if there are sufficient eggs on the accumulator means 102 the motion may be substantially continuous and uninterrupted providing, of course, that the eggs rapidly enough fill the star wheel device so as to effect a continuous operation of the control mechanism therefor.

It is to be understood that the conveyor belt 104 and the plows 108 of the accumulator means 102 are not under the control of the star wheel 106. Instead, they continuously operate unless a further condition which also stops the star wheel, prevails in the machine. These further conditions may be conditions in which, for example, a double egg is detected in the orientor device 112, i.e., two eggs in the same pocket space, a missing egg is detected on the orientor means 112, there is an absence of a carton on the conveyor mechanism 122 or a traffic jam develops either on the transfer conveyor 124 or on one of the main conveyors 126, 128 or 130. Under any of these conditions, a clutch device 171 (FIG. 24) which couples the main shaft 164 of the transmission 166 to the motor 160 is de-energized or de-actuated and as a result drive is interrupted to the container conveyor 122, the packer means 116, the advancing means 118, the orientor means 112, and the star wheel device 106. At the same time, the aforementioned magnetic clutch 150 which drives the accumlater conveyor 104 and the plows 108 is deenergized. It will be understood, of course, that the infeed conveyor 100 continues to feed eggs to the accumulator means 102 even though the entire remainder of the packer machine is shut down as aforesaid. The particular construction of the infeed conveyor 100 and of the accumulator means 102 and the peculiarities of cooperation therebetween are extremely important and will be now described.

INFEED CONVEYOR AND ACCUMULATOR MEANS

Main references: FIG. 1a and FIGS. 2–10.

As can be seen in FIG. 1a, the infeed conveyor 100 includes, in addition to the previously mentioned main feed belt 138 which moves to the right in FIG. 1a in the direction of the arrow 300, the reversing side conveyor belts 302 and 304 moving in the direction of the arrows 306. Eggs which find their way onto the reversing conveyors 302 and 304 are moved towards the inlet end of the main conveyor 138 and are ultimately deflected back onto the main conveyor 138 by means of the deflector wall portions 308 disposed adjacent the inlet end of the infeed device 100, substantially as is shown. FIG. 2 illustrates the manner in which the reversing belts 302 and 304 are reeved on the common drum 134 which also drives the main conveyor 138. Thus, as is shown in FIG. 2, the conveyors 302 and 304 are trained over idler rollers journalled on but separate from the rollers which journal the main belt 138 and which are located on the respective shafts 310 and 312. However, after passing over the idler rollers on the shaft 312, the belts 302 and 304 are reeved over the drum 134 oppositely from the manner in which the belt 138 is reeved thereover, as indicated by the dotted line portion 314 of the reversing belts as shown in FIG. 2. After passing over the drum 134 and in order to secure sufficient circumferential engagement therewith, the reversing conveyor portions 314 are passed over rollers supported by the shaft 316 and ultimately back to the shaft 310 substantially as is shown. In this fashion, as will be readily appreciated, the directions of the top flight portions of the two conveyor belts 302 and 304 are opposite to the direction of travel of the conveyor belt top flight 138.

At the discharge end of the infeed conveyor 100, a deflector wedge indicated generally by the reference character 320 is provided and cooperating therewith is the choke means consisting of the fixed choke plates 321 and 323 and the vertically movable choke plates 322 and 324 located in either side of the machine, substantially as is shown. The plates 321 and 323 are fixed to the frame of the machine and project upwardly between the belts 302 and between the belts 304 and 138, their downstream ends being bent outwardly to overlap the plates 322 and 324, as shown in FIG. 3. The construction, disposition and general arrangement of these component parts and their relationship with the infeed conveyor and with the accumulator means is of extreme importance in successfully practicing the present invention. Thus, it will be seen that the wedge means 320 cooperates with the choke means to provide for confinement and substantial, although not complete, isolation of any eggs accumualted under such a condition as to completely fill the accumulator conveyor 104 and which have become backed up onto the forward end of the main belt 138 and as contained in part by the choke plates 321–324.

Thus, under any circumstances of operation, wherein the belt 104 is completely filled and the main belt 138 is still feeding thereonto so as to accumulate a mass of eggs behind or upstream of the belt 104, the total number of eggs which will be positively fed towards the star wheel means 106 in FIG. 2 will be definitely limited since all other eggs which tend to be conveyed forwardly by the main belt 138 will be thus laterally deflected, substantially in the manner as indicated by the dotted line arrows 326 and 328 in FIG. 3 to pass onto the return belts 302 and 304 to thus provide a continuously circulating action and so that any mass of eggs tending to create further feed pressure against the star wheel means 106 will tend to "shear off" and be deflected onto the return belts 302 and 304 and thus definitely limit the positive feed pressure against the star wheel mechanism. This is an extremely important feature inasmuch as if the eggs are permitted to exert the full feed pressure which a total accumulated mass might otherwise exert, the eggs would tend to "boil up" in the accumulator section causing breakage and/or spillage and breakage thereof. This is particularly true under such circumstances in which the accumulator portion of the machine is completely filled and the packer mechanism is shut down momentarily. Under such circumstances, the belt 104 will cease to operate as will the plows 108 and the remainder of the machine. Under such circumstances, it will be appreciated that there will be some residual feed pressure throughout the accumulated mass of eggs including those on the now dead conveyor belt 104 and against the star wheel means to assure rapid and efficient filling of the star wheel means by virtue of the fact that some of the eggs, but not many, will be exerting feed pressure from the extreme discharge end of the main infeed conveyor belt portion 138. Thus, there is no cessation in the feed pressure towards the star wheel means even though the packer is largely shut down due to an abnormality as aforesaid.

The wedge device 320 may take simply the form of a length of sheet metal bent in fashion shown to present the two legs 340 and 342, diverging in the manner indicated and rigidly affixed at the bite or apex portion thereof to a suitable supporting post 344 fixed to and depending from the bridge plate 346 positioned above the infeed conveyor 100 and fixed to the side frame portions 348 and 350 of the machine, substantially as is shown in FIG. 4. Thus, the deflector 320 and the choke plates 321–324 together with the physical limitation of the main belt 138 form a constriction adjacent the juncture of the infeed conveyor 100 and the accumulator conveyor 104 which, as mentioned hereinbefore, limits the feed pressure of the mass of eggs which may be accumulated downstream thereof.

Another important feature of the invention resides in the provision of the spreader device indicated generally by the reference character 352. This device is of Y-shaped configuration, having the stem 354 and the divergent legs 356 and 358, all rigidly joined together and supported by the shaft 360, see particularly FIG. 4. The shaft 360 is suitably rotatably supported from the bridge piece 346 by means of a bearing collar 362 and the upper end of the shaft 360 is fitted with a crank arm 364 pivotally connected to the drag link 366 which extends therefrom to a point of pivotal connection 368 on the eccentric crank 370 driven by the shaft of the motor 372. Thus, the spreader device 352 will be oscillated, as will be obvious. The stem or leg 354 will be seen to project beyond the apex or bite of the wedge assembly 320 substantially as is shown in FIG. 3 so as to tend to evenly divide the incoming eggs on opposite sides of the wedge and thus provide substantially equal amounts of eggs for operation thereupon by the two spreader arms 356 and 358. The spreader arms 356 and 358 are, on the other hand, seen to overlap onto the intake end of the accumualtor belt 104 and will sweep more or less thereacross. Their divergency naturally tends to accumulate more eggs towards the opposite sides of the belt 104 but in sweeping back and forth, it will be seen that whereas each leg sweeps once toward the side of the associated belt 104, the two legs together sweep twice towards the center of the belt 104 and, in this fashion, substantially uniformly distribute eggs laterally across the belt 104, the purpose of which will be presently apparent. This feature also, is of extreme importance for successful operation of the machine inasmuch, as will hereinafter appear, it is essential that the star wheel device be substantially uniformly fed throughout its length in order for the machine to operate at maximum capacity.

STAR WHEEL DEVICE—ACCUMULATOR MEANS

With reference now more particularly to FIG. 6, the star wheel assembly is shown therein together with the switch mechanisms and also with the plow frame assembly associated therewith. The star wheel frame assembly consists essentially of a pair of uprights 400 and 402 having flanged portions 404 and 406 at their lower ends whereby the frame is rigidly attached to the frame on the machine. The upper ends of the frame members or uprights 400 and 402 are tied together by a strap member 408 bridging therebetween and having opposite flange end portions 410 and 412 overlapping the sides or upper ends of the uprights 400 and 402, substantially as is shown. The star wheel shaft 414 is journalled between the uprights 400 and 402 and six groups of star wheels are fixed to this shaft between the uprights. Two of these or the outer of these star wheels 416 and 418 are thicker at their points 420 and 422, as shown in FIG. 10, and the inner pair 424 and 426 are thinner at their points as at 428 and 430. Furthermore, the curvatures between the points are slightly different so as to define a transverse pocket effect, as will be more readily apparent from a study of the cross section shown in FIG. 8. These groups of star wheels are fixed on the shaft 414 and spaced apart substantially as is shown.

A pair of horizontal rails 434 and 436 extend from the uprights 400 and 402 rearwardly toward the infeed conveyor 100 and carry, at their rearward free ends, the aforementioned choke plates 322 and 324, the purpose of this construction being presently apparent. In addition, these two rail members 434 and 436 carry L-shaped brackets at their forward ends, remote from the choke plates 322 and 324 which brackets have upstanding legs 438 and 440 which are interconnected at their upper ends by a transverse bar member 442. The opposite ends 444 and 446 of this bar are guidably received in notches 447 extending downwardly from the upper ends of the uprights 400 and 402. This is shown in FIG. 9 and as is also shown therein, the opposite ends 446 and 448 of the bar 442 may be provided with end plates 449 secured as by fasteners 451 to such ends of the bar 442 and which engage against the outer sides of the uprights 400 and 402 to laterally stabilize the frame of which the bar 442 forms a part. As will be presently seen, the entire frame assembly comprising the rails 434, 436, the uprights or bracket legs 438 and 440 together with the bar 442 are vertically reciprocated during operation of the machine. The bars 434 and 436 carry axles or pin members 450 and 452 which are guidably received for vertical motion in vertically elongate slots in the uprights 400 and 402. These axles or pins 450 and 452 carry roller members 454 and 456 which, as will be presently apparent, are engaged by arm members for vertically reciprocating the frame as aforesaid.

The frame bar 442 carries a plurality of depending bracket members 460 which may be identical with the brackets 438–440, each of which is provided, at its lower end, with one of the plow members 108 previously mentioned. Each plow includes an elongate body 451 depending from and extending forwardly of its associated bracket 460 to terminate in a tapered nose 453 facing in the direction of the accumulator conveyor 104 and sloping upwardly and forwardly of its upper edge. Further, each plow includes a foot plate 455 attached to the bottom face of the body 451 and dimensionally larger than such body on the sides and beyond the nose 453 thereof, as is shown in FIG. 1a. Thus, the frame which consists of the rails or bars 434 and 436, the brackets 438 and 440 and the bar 442, together with the brackets 460 when vertically reciprocated, effects vertical reciprocation of the plows 108 as previously described. Furthermore, as will be readily apparent by virtue of the fact that the choke members 322 and 324 are connected to the opposite ends of the rails or bars 434 and 436, they also are imparted of vertical reciprocatory motion. It is for this reason, as is shown in FIG. 3, that the choke plates are provided with bottom ledge portions 462 and 464, to engage underneath the eggs if they are present in engagement with the choke plates on the accumulator means side thereof to vertically agitate the same and maintain the entire mass of eggs, when the belt 104 is operating, in loose and jostled condition so as to effectively achieve movement of the eggs towards the star wheel device. Moreover, it will be seen that these shelves 462 and 464 will maintain eggs which might have been engaged upon the reverse belt members 302 and 304 so as to be lifted and permitted to proceed toward the star wheel device.

Below the star wheel device are a pair of through rods 470 and 472, see particularly FIG. 8, which mount six groups of plate members 474 thereon. Each of these plate members is interdigitated between the spaces presented by the star wheel elements 416, 418, 424 and 426, substantially as is shown in FIG. 6 and the upper edges of these plates are cooperable with the star wheel devices, as is shown in FIG. 8, to properly guide the eggs through the device. There are three plates in each group as indicated by reference characters 469, 471 and 473. The upper edges of the outer plates 469 and 471 are higher than the upper edge of the center plate in each case. Thus, the upper edge portions 480 of the outer plates which are transversely coplanar, provide, in cooperation with the contours of the star wheels, and the upper edges of the intervening plate 473, means for receiving and at least temporarily supporting the eggs as they are fed to the star wheel devices. The trailing upper edges 482 of these plates 474 permit the eggs to roll by gravity to the orientor device 112 also shown partially in FIG. 8.

For reciprocating the plow frame, it will be noted that the shaft 484 which carries the roller 486 over which the star wheel end of the accumulator belt 104 is trained also carries a cam element 488. This cam has four lobes 490. At either side of the machine, outboard of the opposite sides of the conveyor belt 104 are bracket post members 492 mounting pins 494 rotatably supporting forwardly extending arms 496. The forward ends 498 of these arms engage with the aforementioned respective rollers 454 and 456 and intermediately of the ends of these arms are cam roller devices 500 mounted on pins 501 carried by the arms 496 which engage with the cams 488. Thus, as the conveyor 104 is operated, the arms 496 are oscillated up and down to impart vertical reciprocatory motion to the plow carrying frames.

To sense the presence of articles in the pockets presented by the star wheels, there are provided a plurality of switch actuating devices, each of which is substantially as is shown in FIG. 7. Each such switch actuating device includes a pintle pin member 502 mounting an L-shaped bracket member 504 having a free leg portion 506 adapted to engage against a switch arm 508 and close an associated normally open switch such as those indicated by the reference character 510 in FIG. 6. The other leg 504 in each case mounts a feeler wire device indicated generally by the reference character 512 which projects therefrom down towards the region of the associated pocket of a star wheel cluster substantially as is shown in FIG. 8. Each switch is mounted on a bracket 516 depending from the aforementioned strap member 408 and suitably secured thereto as by fasteners 518 and the lower extremity of the bracket 516 in each case mounts the pintle pin member 502 of the switch feeler assembly substantially as is shown. Each bracket 516 carries a stop pin 520 for the arm 506 of the switch feeler against which the feeler rests when no eggs are present, as is shown in dotted lines in FIG. 8. On the other hand, when an egg is present in an associated star wheel pocket, as is shown in full lines in FIG. 8, the leg or arm 506 will engage the switch arm 508 and close the associated normally open switch 510. When all of the switches are thus closed, indicating the presence of eggs in all of the pockets of the star wheel device, circuitry is energized, as hereinafter more particularly set forth, to actuate the magnetic clutch 171 completing the drive to the star wheel shaft 414. In other words, the star wheel clusters are normally idle and do not rotate and are rotated only in response to closed condition of all of the six switches 510.

In order to properly deenergize the clutch 171 at the proper time and thus properly position the star wheels after advancing a row of eggs, a switch assembly such as is shown in FIG. 11 is utilized in parallel with the six switches 510. This switch may take the form of a breaker arm member 524 pivoted as at 526 and mounted as a unit on the upright 402 previously mentioned and the free end of the arm 524 cooperates with a fixed contact member 528, much the same as in an automotive distributor breaker switch. The arm 524 is provided with a dielectric rubbing block 530 which engages a cam 532 having four lobes, corresponding with the number of pockets on the star wheel device. The switch feelers 512 are short enough so that before the star wheel device is indexed to the next position (i.e., 90° rotation) the feelers 512 will drop off the eggs and the corresponding switches 510 will all assume their normal open position. However, at the same time, the rubbing block 530 of the switch assembly shown in FIG. 11 and which is in parallel with the several switches 510, has passed over the cam lobe and has become closed, thus taking over the continuance of drive of the star wheel device. This drive will continue until the rubbing block 530 hits the ramp for the next cam lobe and opens the contacts at 528 which thus deenergizes the clutch 171 and stops further rotation of the star wheel shaft. Thus, an accurate positioning of the star wheel device may be attained at all times and is not dependent upon the switch feelers 512. This is an important practical consideration inasmuch as the shape and size of eggs, even in the same grade, would render it virtually impossible to properly position the star wheel every time if the feelers 512 were utilized for both starting and stopping the star wheel device. Thus, in accordance with the present invention, the feelers 512 only initiate each rotation of the star wheel device whereas the switch shown in FIG. 11 terminates the rotation thereof for each cycle.

It will be further understood in conjunction with the present invention that although the star wheel device is inherently a step-by-step mechanism, the actual operation of the machine when there are sufficient eggs in the accumulator means for presentation to the star wheel device, and in the absence of abnormalities shutting down the packer machine otherwise, effects a substantially continuous motion of the star wheel shaft 114 to uninterruptedly advance rows of six eggs one behind the other to the orientor device 112.

ORIENTOR MEANS

The orientor means consists essentially of a pair of parallel and laterally spaced endless chains such as the chains 600 shown in FIG. 12 which are trained at their rearward ends about sprockets such as the sprocket 602 rigid with the shaft 604 suitably journalled on the frame of the machine and about sprockets 605 corresponding to the sprocket 602 on a shaft 606, see FIGS. 2 and 16, which are at the forward end of the orientor means adjacent the advancing means 118. The two chains carry in longitudinally spaced relationship thereon bracket members 610 substantially as is shown in FIG. 12 for example to which the opposite ends of tent bars 614 are welded or otherwise suitably secured so as to span between the chain members in longitudinally spaced relationship to each other. The rearward leg 616 of each tent member is slightly longer than the leading edge 618 thereof and the chains also carry a plurality of longitudinally spaced rollers 620 so positioned relative to the tent members as to expose each roller beyond the short leg 618 of each tent member, as can be seen for example in FIGS. 12 and 16. Thus, each row of eggs is supported partially on the trailing leg 616 and partially on the roller 620 immediately therebehind in the fashion which is clearly illustrated in FIG. 12. At the entrance portion to the orientor means, the frame of the machine carries shelf members 624 on either side thereof which are of sufficient height to provide support surfaces for the opposite ends of the rollers 620 as they pass thereover. Thus, as the chains 600 move along and thereby carry the rollers with them, the engagement of these rollers 620 on the shelf members 624 will impart rotation to the rollers and spin the eggs. As is well known, the ovoid shape of the eggs will cause the eggs to "walk" longitudinally of the rollers and transversely of the orientor machine. This action is such that the pointed ends of the eggs will always move to engage against the divider walls 626 which will run substantially the length of the orientor means and form channels or passages isolating eggs adjacent to each other in the same row from each other. Thus, before the eggs have traversed very far longitudinally of the orientor device, the spinning action imparted thereto by the rollers, which in the rear part of the orientor are caused to spin by the shelf members 624, will cause the pointed ends to engage the various walls 626. The shelf members 624 are discontinued after awhile, before the eggs reach the forward end of the orientor device and the rollers simply remain idle and the eggs are cradled in the position with their points closely adjacent or touching the walls 626. Toward the exit end of the orientor device, and cooperating between each pair of walls or channel members 626 are a pair of spring devices such as those indicated by the reference characters 628 and 630 in FIG. 15 which converge inwardly relative to the channels formed by the walls 626. Because of the convergency or inward angulation of these two members 628 and 630 for each channel, the point of the egg will drag behind as the orientor conveyor moves ahead and the butt ends of the eggs will be turned around in the manner illustrated in FIG. 15 so that they point forwardly along the direction of travel of the rows of eggs.

As is also shown in FIG. 15, the channels in each case are brought closer together once the eggs have been oriented so that, ultimately, the walls 632 defining the channels at the discharge end of the orientor device are just sufficiently close together as to just pass the eggs lengthwise therebetween, substantially as is shown at the right-hand side of FIG. 15. It will be further noted that once the eggs have been oriented, as by the spring fingers 628 and 630, the walls of the channels are, thereafter, disposed in parallelism and spaced apart sufficiently close to each other as to prevent the eggs from being turned crosswise and thereby losing their orientation. During all the progress through the spring fingers 628 and 630 and the region of channel convergencies, the eggs are transported by the orientor conveyor mechanism, the rollers being idle during all of this time so that no spinning action is effected upon the eggs. As a matter of fact, it is sufficient to cease spinning action on the eggs, as by cessation of the shelf members 624 in advance of the spring fingers 628 and 630.

Referring at this time to FIG. 12, one of the abnormal conditions mentioned hereinabove which can occur on the orientor device will be seen to be detectable by the mechanism shown therein. Thus, in FIG. 12, the frame of the machine rotatably mounts a transverse shaft member 634 which carries a plurality of fingers 638 (FIGS. 12 and 13) and which also carries an actuator disc 636 thereon. When the parts are in the position shown in FIG. 12, the trailing switch arm 640 on the disc 636 and which is rigid therewith engages the switch arm 642 so that the switch 644 is disposed in closed position. If, however, more than one egg is received in any one individual space in a row such as for example as shown in FIG. 14, the corresponding paddle or spring arm 638 will be swung upwardly as shown so that the switch 644 will be opened and operation of the packer is ceased. That is to say, the motor 372 which drives the spreader mechanism is deenergized, the magnetic clutch 150 which control operation of the conveyor belt 104 is deenergized, and the magnetic clutch which controls the transmission assembly 156 is deenergized so that the carton conveyor mechanism, the packer device 116, the advancing device 118, the orientor device 112 and the star wheel mechanism 106 are disabled. When the operator corrects the situation, the machine will begin operation again. A similar type of switch mechanism may also be mounted for cooperation with the eggs in the orientor mechanism 112 to detect a missing egg in any one of the pockets or space in a row.

As is shown in FIG. 16, when the eggs are discharged from the end of the orientor device, they are received in cup members or supports 650, one of which is provided for each of the channels between the walls 632, see FIG. 15. At this point, when the eggs are resting in these cups 650, they are no longer imparted of motion by the orientor device 112 but are securely held in oriented position, that is butt end forward, by the cooperating side walls 652 of cups 650 and under the action of the spring finger devices 654 and 656. The former of these devices assures a good transfer between the orientor and the cups 650, the rear ends of the cups being open and the latter of these spring fingers, 656, lightly pressing the eggs down against the bottom of the cups 650 and assuring good transfer to the packer means 116.

It is preferred that the aforementioned missing egg switches be located at or close to the forward end of the orientor means. There, as in FIG. 16, switch arms 651 are mounted to permit switches 653 to open in the event that an egg is missing in any associated row.

PACKER MEANS AND ADVANCING MEANS

With reference to FIGS. 16 and 19, the frame of the packing machine will be seen to include a pair of uprights or posts 700 and 702 which mount a pair of pillow blocks 704 and 706 which rotatably support the shaft 180 therebetween, which shaft projects beyond one side of the frame and is provided thereon with the sprocket 182 described hereinbefore in conjunction with FIG. 2. Inboard of the pillow blocks 704 and 706 are a pair of plates 710 and 712, the shaft 180 passing through these plates and with the plates being provided with bearing assemblies 714 and 716 by means of which the plates 710 and 712 are supported by the shaft 180. The two plates 710 and 712 are fixed relative to the frame members 700 and 702 by additional bracket members 718 and 720 so that, with respect to the frame of the machine, the plates 710 and 712 are fixed. Adjacent the lower ends of the plates 710 and 712 and rotatably supported therebetween is the idler shaft 722 which is disposed in parallelism with the shaft 180. The shaft 180 carries a pair of sprockets 724 and 725 and the shaft 722 carries a pair of sprockets 726 and 727, the sprockets 724 and 725 being larger than the sprockets 726 and 727 as will be evident from FIG. 16. Trained around these pairs of sprockets, which are in vertical alignment, are a pair of endless chain loops or members 728 and 730 and it is from these chain members 728 and 730 that the main components of the packer wheel assembly are mounted.

In addition to the sprocket 182 and the sprocket 724, the shaft 180 also carries the sprocket 176, described previously in conjunction with FIG. 2, with which the chain 174 is engaged to impart drive from the transmission 166 to the packing means assembly 116.

Fixed to each of the chains 728 and 730 are a plurality of journal block members 732 and 734 which, as can be seen from FIG. 19, are disposed in aligned pairs between the two chains, these blocks being further shown in FIGS. 21 and 22. A frame assembly indicated generally by the reference character 736, for example, in FIG. 19, is carried between each such aligned pair of blocks 732 and 734 and these frame assemblies are, therefore, carried around the path defined by the chains 728 and 730 as the packer means is operated. As can be seen from FIG. 21 each of the blocks 732 rotatably mounts a shaft or pin 738 which projects completely through the associated block 732 and projects from opposite sides thereof. Fixed to the outer end of this shaft 738 is a crank arm 740 carrying a cam roller member 742 at its free end, the purpose of which will be presently apparent. The inner end of each shaft 738 is provided with a thrust bearing and spacer member 744 and receives the leg 746 of one section of each frame 736 substantially as is shown in FIG. 21. The leg 746 of each frame section is rotatably mounted on the shaft 738 so that the frame section which includes the leg 746, the main body portion 748 and the opposite leg 750 (see FIG. 19) is rotatable with respect to its associated shaft 738. To complete each frame 736, there is a second frame section which includes the leg portions 752 and 754 (FIGS. 21, 22 and FIG. 19) and the intervening main body portion 756 interconnecting the same. The frame section leg 750 in each case is fixed as by welding to the shaft 764 journalled in the respective blocks 734 whereas the leg 752 is likewise fixed as by welding to the inner end of a respective shaft 738 and the remaining leg 754 in each case is journalled on a respective shaft 764. Thus, the two frame sections are rotatable with respect to each other and, as will hereinafter be seen, the relative as well as total dispositions of these frame sections are controlled by cam assemblies at opposite sides of the packer means. Although the frame section which includes the legs 752 and 754 and the main body 756 is rotatable with respect to its counter part and is rigid with the crank arm 740, the other frame section is rigid with the crank arm 760 disposed at the opposite side of the machine, see particularly FIG. 19. Each of the crank arms 760 carries cam rollers 762, while the crank arms carry the rollers 742, the purpose of which will be presently apparent.

With reference to FIG. 22, it will be seen that the crank arm 760 is fixed to the shaft 764 which projects through the associated block 734 in turn carried by and fixed to the chain 730 and that a spring device 766 is anchored at one end 768 to the crank arm 760 and has its opposite ends 770 anchored to a pin 772 which is rigid with an extension 773 (FIG. 19) of the leg 754 of the frame section which is controlled by the crank arm 740 as shown in FIG. 21. A stop pin 774 is fixed to the leg 750 and forms an abutment against which the extension 773 of leg 754 engages to limit or fix the angular disposition between the two sections of each frame. Thus, the spring devices 776 normally urge the frame sections to relative positions such as are shown in FIG. 22, for example. The two sections of the frame 736 are urged, under the action of the spring 766, to normally engage the projection or extension of the arm 754 against the stop pin 774 and thus close the frame assembly, or rather the two sections thereof. However, the two frame sections in each case may be pivoted or moved relative to each other, about the aligned axes of the shafts 764 and 738, in a direction which would be counterclockwise for the upper frame section in FIG. 22 and clockwise for the lower frame section in FIG. 22. Thus, insofar as the crank arms 760 and associated rollers 762 are concerned, they control, as will hereinafter be explained, opening and closing of the sections of each frame 736.

As may be seen in FIG. 21, on the other hand, the crank arms 740 and their associated rollers 742 are effected to control the angularity or rotational position of the frames 736 with respect to the chains 728 and 730. The manner in which this is accomplished is by a spring device 780 having one end 782 anchored against the associated chain 728 and having its opposite end 784 anchored to the associated crank arm 740. The effect of the spring 780 in each case is to tend to rotate the frames 736 in a clockwise direction when viewed from the lefthand side of FIG. 1 or when viewed as in FIG. 16.

Thus it will be seen that the rollers 742 may control the angular disposition of the entire frame 736 relative to the chains 728 and 730 whereas actuation of both rollers 742 and 762 simultaneously may be utilized to open and then permit closing of the sections of each frame 736. The manner in which this is accomplished is, in the specific embodiment herein described, by forming the contour of the plate 710 as a cam, see particularly FIG. 20a, and by providing interrupted cam members on the plate 712, see particularly FIG. 20. Thus as can be seen in FIG. 20, the plate 712 has three cam assemblies 800, 802 and 804 mounted thereon. Each of these has a flange in cooperation with the cam rollers 762, such flanges being respectively indicated by reference characters 806, 808 and 810. On the other hand, as is shown in FIG. 20a, the rollers 742 are constantly urged against the periphery of the cam plate 710 under the action of the spring 780 as previously set forth. The action is such that the angular disposition of the frames 736 relative to the chains 728 and 730 is established by the cam plate 710 at all times, whereas whenever one of the cams 800, 802, and 804 is encountered so that both rollers 742 and 762 are simultaneously under cam action, the frame sections in each case will be opened and then closed. Thus, the cam 800 is for the purpose of opening the frame sections at the loading point for the packing means, the cam 802 is a "jostling" cam which momentarily partially opens the frame sections to "jostle" the eggs in each of the baskets carried by the frames and thus assure that they will be properly disposed, as hereinafter appears, and the cam 804 is for the purpose of opening the frame sections to deposit the eggs in the containers carried by the carton conveyor assembly.

Each of the main frame members 748 and 756 carries a series of fingers. Thus, the main frame member 748 carries pairs of fingers 830 whereas the other main frame member carries pairs of fingers 832 oppositely disposed from corresponding fingers 830. The main frame 748 carries bottom bracket members 834 upon which are mounted sponge rubber pads 836 so that the pairs of fingers 830 and 832 and corresponding pads 836 form cages or baskets which can be opened and closed to receive and deposit the eggs in a row of six, substantially as is shown. The actions of the cams on either side of the packer means will be seen more clearly from a study of FIG. 16. In this figure, the cam wheels 742 which control the frame section carrying the fingers 832 and the frame in its entirety when the rollers 762 are not engaged with their cams 806, 808 or 810, continuously ride on the profile of the cam plate 710. Thus, when the wheels 762 first engage the cam 806, see FIG. 20, the disposition of the fingers 832 as under the control of the cam plate 710 will be unaltered but the fingers 830 will be swung counterclockwise relative to the fingers on the other frame section so that when the parts reach the position shown in FIG. 16 for the assembly indicated generally by reference character 834, the fingers 830 and 832 will be disposed far enough in spread relationship so as to receive an egg therewithin. Synchronized with the positioning of the transverse row of baskets or cages on each of the frame assemblies is the transport or advancing means 118 which, as previously described, is synchronized with the operation of the packer means 116. The advancing means 118 is illustrated better in FIGS. 17 and 18. Uprights 840 are rigidly affixed to the packer machine frame at opposite sides thereof and they rotatably support therebetween a shaft 842. This shaft carries, at one end thereof, the aforementioned sprocket 188 and the bracket or upright 840 rotatably locates the aforementioned sprocket 186. The shaft 842 carries a pair of spaced end plates 844 and a series of stub shafts 846 are disposed in circumferentially spaced relationship and journalled or loosely fitted within the end plates 844 and each pair of such stub shafts 846 on the spaced plates 844 are interconnected by bar members 848, each of which bars carries a series of six advancing fingers 850. As shown, these advancing fingers may be bifurcated at their ends to provide the tines 852 slightly angled with respect to each other and these fingers are adapted to sweep through the ends of the channel portions of the orientor device and, in particular, to sweep through the supporting frames 650 wherein the oriented eggs are disposed. Because the stub shafts 846 are journalled within the end plates 844, the bars 848 are rotatable with respect to the end plates 844. However, the fingers 850 carry bracket members 852 to which are anchored the opposite ends of helical tension springs 853 extending between opposed bracket members 852 connected to diametrically opposed fingers 850. The fingers 850 are normally fixed by virtue of the fact that a sleeve 854 is fixed to each of the shafts 846 and each such sleeve is provided with a rigid finger member 856 normally engaging the stop pin 858 fixed to one end plate 844. A rigid cam 860 is fixed to the frame of the machine through the medium of a sleeve 862 having a bracket arm 864 thereon and which is secured as by bolt assembly 866 to the frame piece 840. Thus, as the shaft 842 is rotated, the arms 856 of the various fingers will engage the cam and the action is such as to bring the fingers 850 towards the eggs in the baskets 650 but to be decelerating at the time that they engage such eggs, as they progress down the ramp portion 870 of the cam 860 so as to provide a quick acting, but gentle displacement of the eggs from the baskets 650 and into the open cages as indicated by the reference character 834 in FIG. 16.

As soon as these eggs have been loaded into the row of cages, and motion of the means 116 is continued, the eggs will next be positioned such that the cam 808, FIG. 20, will be engaged to partially open the cages, by movement of the fingers 830 thereof so as to "jostle" the eggs in the event that there is any misalignment of one or more eggs in any of the various baskets. It will be noted that this action occurs while the cages are between a horizontal and an upright position, preferably near but not quite at the horizontal position as controlled by the cam plates 710. The misalignment of eggs is minimized as much as possible by the spring finger extensions 872 (FIG. 16) which extend from the baskets 650 and are cleared between adjacent pairs of fingers 832 and 830. Furthermore, the orientation and gentle lowering of the eggs is achieved by an extension portion 874 of the aforementioned spring fingers 656, see FIG. 16. Thus, every effort is made to maintain the eggs in oriented, i.e., lengthwise disposition within the cages but in the event that due to an unusual shape of an egg, one or more of them becomes misaligned slightly within the cages, the cam 808 will correct this situation.

The eggs are continued in their movement downwardly as shown in FIG. 16 and the cam plate 710 eventually substantially vertically downwardly positions the cages on the frames 736. When the cages are in position to deposit the eggs on the cartons or containers, which, incidentally, are moving at the same time, the profile on the bottom tip of the cam plate 710 is such as to cause the fingers 832 to "dip into" and follow the pockets or receptacles in the containers whereas the cam 804 (ledge 810) will cause the fingers 830 to sweep away, to the right at the lower portion of FIG. 16, and open the cages and thereby deposit the eggs properly within the pockets in the containers.

THE TRANSMISSION

Figure 26:
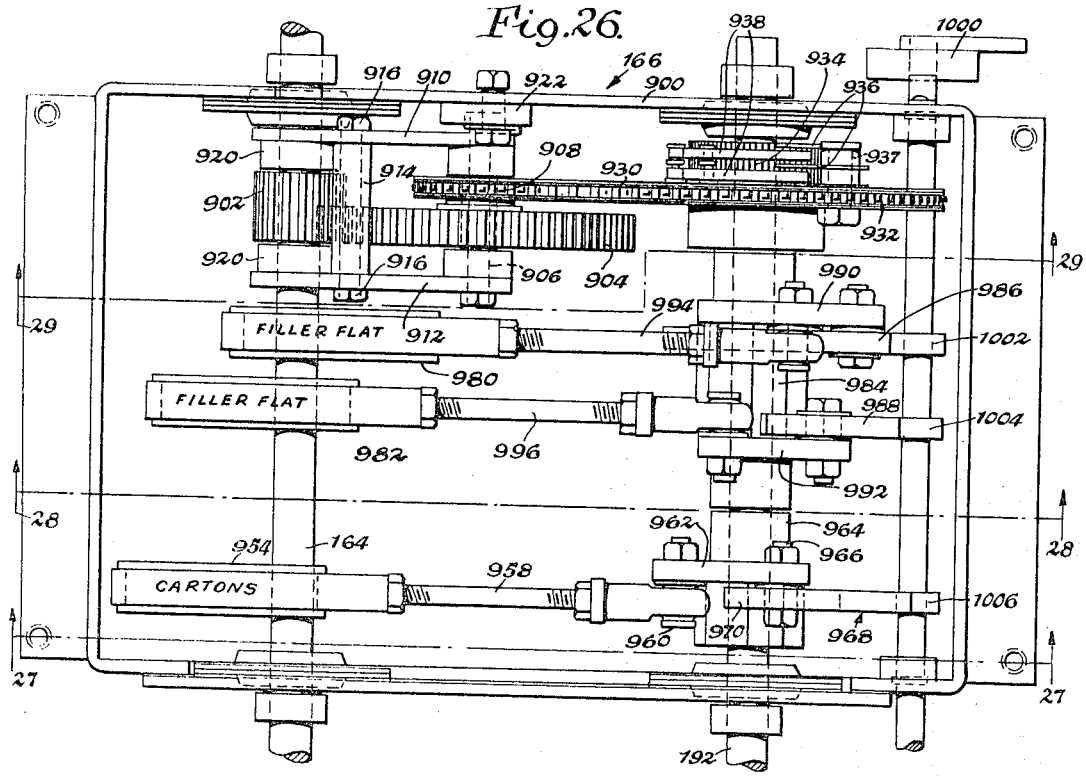
FIG. 26 is an enlarged horizontal section taken through the transmission assembly and showing the arrangement of parts therein.
Figure 29:
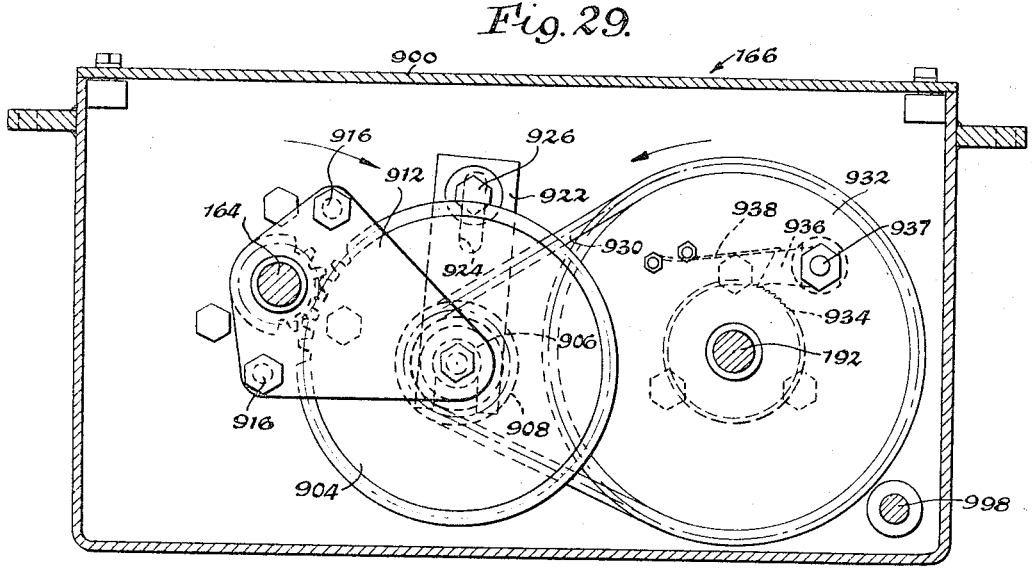

Referring to FIG. 26 in particular, the transmission will be seen to include a case or body 900 suitably journalling the two shafts 164 and 192 previously described, such shafts being disposed in spaced parallelism with each other as is shown. The shaft 164 is, as aforesaid, driven from the motor 160 whenever the magnetic clutch 171 is engaged. With the transmission case, the shaft 164 carries a spur gear 902 which meshes with an idler gear 904. The gear 904 is journalled on a shaft 906 and the sprocket 908 is fixed to the gear 904 so that the gear and sprocket turn in unison. The shaft 906 is mounted between a pair of bracket arms 910 and 912, see also FIG. 29, which bracket plates are secured together by spacers 914 and suitable fasteners 916 and which brackets are journalled as by bushing portions 920 to the shaft 164. A link member 922 is provided with a bifurcated lower end as shown in FIG. 29 and is clamped to the bracket 910 by a fastener which also serves to secure the shaft 906 in place and the upper end of this link member is provided with an elongate slot 924 cooperating with a fastener member 926 so as to swing the brackets 910 and 912 about the center of shaft 164. The reason for this construction is to permit slack to be taken up in the chain 930 which effects a drive between the sprocket 908 and the sprocket 932.

As can best be seen in FIG. 29, the shaft 192 carries a ratchet member 934 and one face of the sprocket 932 carries a pair of pawls 936 as by journal pin 937, which pawls are normally spring urged by the resilient fingers 938 into engagement with the ratchet 934 so that the two shafts 164 and 192 are normally driven in synchronous relationship. However, as has been previously pointed out, due to the fact that the containers on the carton conveyor will be spaced apart, it is necessary to periodically impart a greater rotational speed to the shaft 192 since it is this shaft which effects drive to the carton conveyor, the shaft 164 driving the packer means 116, the advancing means 118, the orientor device 112 and the star wheel mechanism. For this purpose, a further drive connection is effected between the shafts 164 and 192 to achieve the timed, increased speed to the shaft 192.

Figure 27:
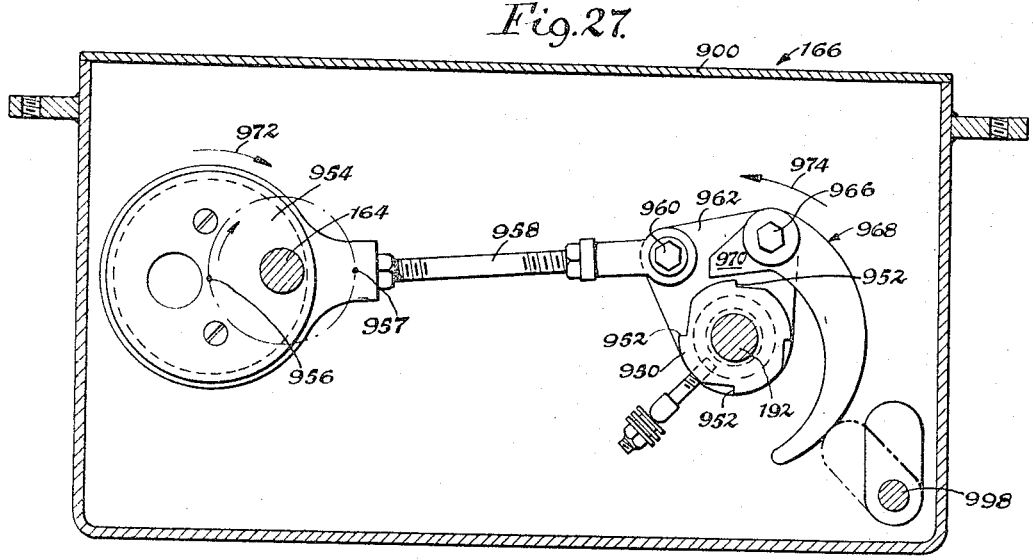
FIGS. 27–29 are vertical sections taken through the transmission assembly and indicated by the respective section lines 27—27, 28—28 and 29—29 in FIG. 26.

One such drive between the shaft 164 and the shaft 192 which is utilized whenever egg cartons containing one dozen eggs are being filled, consists of the arrangement shown in FIG. 27. The shaft 192 carries a ratchet member 950 having four ramps or teeth 952 thereon. Opposite this ratchet 950 and on the shaft 164 is an eccentric 954 having its effective center at 956, as shown. A connecting rod 958 is journalled on the eccentric 954 and is pivotally connected, as at 960, to a plate member 962 which is journalled, as by boss portion 964 (FIG. 26) on the shaft 192. The plate 962 pivotally carries, as at 966, a ratchet member 968 having a ratchet nose portion 970 cooperable with the teeth 952 on the ratchet 950.

As has been explained hereinbefore, the carton conveyor must alternately describe short and long strokes in order to properly dispose egg cartons containing one dozen eggs in proper relationship with the packer means 116 when the baskets or cages thereof are in the position to deposit a row of six eggs into the cartons. Thus, the arrangement shown in FIG. 27 is such as to permit this action. To illustrate, assume that the parts are in the position shown in FIG. 27, the shaft 164 rotating in the direction of the arrow 972 and the shaft 192 rotating in the direction of the arrow 974. Under these circumstances, it will be seen that the connecting rod is moving toward the left in FIG. 27 and is almost at the end of its stroke in this direction whereas the ratchet 950 is moving counter-clockwise. When the shafts 164 and 192 have rotated to the position in which the center 956 of the eccentric 954 has moved to the position 957, the connecting rod 958 is at the end of its stroke towards the right in FIG. 27, the nose 970 of the pawl 968 will engage with the ratchet tooth 952 which, in FIG. 27, is immediately below the nose 970. This is due to the fact that shaft 192 is rotating at a speed which is much slower than that of shaft 164. At this point, the continued rotation of the shaft 164 in the direction 972 will now move the connecting rod 958 to the left but the nose 970 of the ratchet is now engaged with the ratchet 950 and this will cause the shaft 192 to rotate at a faster speed, the pawl and ratchet mechanism of FIG. 29 being overridden in this case, until the shaft 164 has reached a position in which the connecting rod 958 has reached the end of its stroke to the left in FIG. 27, whereupon the pawl and ratchet mechanism of FIG. 26 will once again take over rotation of the shaft 192.

In the specific embodiment shown, the shaft 164 is driven at 30 r.p.m., and through the mechanism of the gear train 902, 904, 908, 930 and 932, the shaft 192 is rotating at approximately 2 r.p.m. The eccentricity of the eccentric 954 together with the spacings between the ratchet teeth 952 so times the operation of the connecting rod 958 with the ratchet 950 that when the shaft 164 has rotated one-half revolution, the shaft 192 has rotated approximately one-thirtieth of a revolution so that on the return or left-hand stroke of the connecting rod 958, the pawl 970 will rotate the shaft 192 at a speed of approximately 15 r.p.m. for approximately 75° of rotation and this rapid speed of rotation of the shaft 192 will occur every other half revolution on the shaft 164. With such an arrangement, it will be noted that the position at which a carton is placed every time the high speed rotation of the shaft 192 ceases is identical in each and every instance so that the synchronous and timed relationship between the packing means 116 and the carton conveyor mechanism is exact and absolute throughout the operation of the machine.

However, it will be obvious that the capability for initially adjusting the exact position of the cartons is desirable and, moreover, that adjustments during operation of the machine would also be desirable, in order that the fingers 830 and 832 of the packer means are precisely and accurately related to the pockets of the containers. For this purpose, a pair of idler sprockets 911 and 913 (FIG. 25) are mounted on a support plate 915 depending from and rigid with an adjustment bar 917. The bar is pivoted to the machine frame at 919 and its opposite end is provided with a screw thread clamping member having a hand knob 921 by means of which the bar may be adjusted about its pivot 919. The sprockets 911 and 913 are fixed with respect to each other and engage the container conveyor drive chain 194. Thus, when the bar 917 is adjusted, the container conveyor is moved slightly with respect to and beneath the packer means 116 so that a fine adjustment may be made insofar as the disposition of containers with respect to the fingers 830 and 832 of the packer means are concerned.

Figure 28:
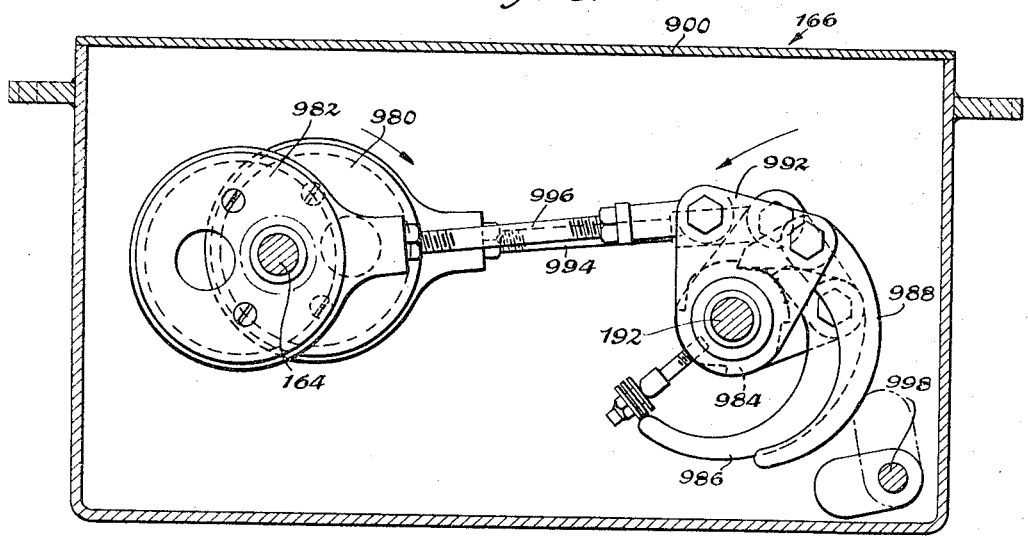

When filler flats are utilized on the carton conveyor, such filler flats having five rows of six eggs, it is necessary to utilize two eccentrics 980 and 982 in order to achieve the proper synchronous and timed drive for the shaft 192. With filler flats which, as aforesaid, contain five rows of six pockets to be filled with eggs, it is necessary to provide one fast speed of rotation for the shaft 192 followed by four normal movements or steps thereof as effected by the pawl and ratchet mechanism 934, 936 of FIG. 29 and to then effect again a fast speed of rotation. The manner in which this is accomplished is shown in FIG. 28. In this arrangement, a ratchet 984 is fixed to the shaft 192 which ratchet is identical in the spacing of its teeth to the ratchet 950 and, moreover, this ratchet is common for the two pawls 986 and 988 mounted on the respective plates 990 and 992 (see particularly FIG. 26). The two eccentrics 980 and 982 are of shorter throw than the eccentric 954 of FIG. 27 so that the pawls 986 and 988 do not "catch up" to the teeth of the ratchet 984 once every revolution of the shaft 164 as is the case with FIG. 27. Instead, the throws of the eccentrics 980 and 982 are such that the pawls 986 and 988 only "catch up" with a respective ratchet tooth once every five revolutions of the shaft 164. Thus, the operation is that, starting with one long movement of the carton conveyor or fast speed motion of shaft 192, one of the ratchets 980 and 982 will effect this motion and then, because of the 180° offset between these two eccentrics 980 and 982, the other eccentric will "catch up" two and one-half revolutions later so as to effect the next long movement of the carton conveyor or fast speed rotation of the shaft 192 and there will be intervening therebetween two complete revolutions of the shaft 164 corresponding to four filler flat spaces before the second fast speed rotation of the shaft 192. Then, there will be another four rows of the filler flat passed by the slow speed rotation of shaft 192 as effected by two complete revolutions of the shaft 164 and then the original eccentric 980 or 982 will once again effect a fast speed rotation of the shaft 192. Thus, it is possible with the arrangement as specifically shown in the drawings to so modify the throws or eccentricities of the eccentric members as to make the pawl mechanisms "catch up" with the ratchet teeth after different intervals and, in the specific instance shown, the eccentricities of the eccentrics 980 and 982 are such as to permit the pawls associated with the eccentrics to "catch up" with the teeth on the ratchet 984 once every five revolutions of the shaft 164.

As is the case with the eccentric system shown in FIG. 27, the two eccentrics 980 and 982 mount the connecting rods 994 and 996 which effect the oscillation of the carrier plates 990 and 992, these latter plates being mounted in the fashion identical with that described in conjunction with the plate 962.

Obviously the eccentric 954 cannot be operating at the same time that the eccentrics 980 and 982 are operating. For this reason, a control shaft 998 is provided which is journalled in the transmission case 900 and has a hand knob and indicator 1000 exteriorly thereof and which carries, interiorly of the casing, a plurality of control fingers 1002, 1004 and 1006. When the control arm 1006 is in the full line position shown in FIG. 27, the control arms 1002 and 1004 are in positions such as are illustrated by the dotted line position for the arm 1004 in FIG. 28 which will move the two ratchets 986 and 988 clockwise in FIG. 28 so as to prevent engagement with the ratchet 984. Conversely, when the arms 1002 and 1004 are in the full line position shown in FIG. 28, the arm 1006 will be in the dotted line position shown in FIG. 27 so as to prevent actuation of the pawl member 968 therein.

CONTAINER CONVEYOR MECHANISM

The container conveyor mechanism is shown in FIGS. 1a, 2, 24 and 25. As is shown in FIG. 1a, the carton conveyor mechanism includes a pair of tables 1100 and 1102 presenting a passageway 1104 therebetween. The drive shaft 198 (FIG. 24) mounts a sprocket at 1106 and the idler shaft 1108 disposed at the opposite end of the frame constituting the container conveyor support mechanism mounts a sprocket at 1110 and these two sprockets form means over which the endless chain 1112 is trained. At spaced points longitudinally along the chain 1112 are provided the pusher bars 1114 which overlie, at their opposite ends, the two table portions 1100 and 1102. Thus, the cartons, the filler flats, or the like are actually supported by the table portions 1100 and 1102 but are pushed therealong by the pusher bars 1114.

Since the packer means 116 is at a fixed position, it is necessary to move the floor plates 1100 and 1102 in a vertical manner in order to achieve accommodation for cartons of varied heights. For this purpose, the table assemblies 1100 and 1102 preferably include the forward sections 1118, see particularly FIG. 2, which are pivoted at 1120 to the frame members of the machine and which are hinged as at 1124 to the main portions of the tables which are disposed to the right thereof as is shown in FIG. 2. Secured to the underside of the main portions 1126 (see FIG. 25) are depending bracket ears 1128 and to each of such bracket ears is pivotally secured a bell crank plate 1130. FIG. 24 illustrates such series of bell crank plates 1130 and also illustrates the frame-carried shaft 1132 which pivotally supports these crank plates to control vertical motion of the trailing portions 1126 of the tables 1100 and 1102. Spaced rearwardly from the plates 1130 are a second series of plates 1134, respectively carried on the frame-mounted shaft 1136 and which plates are joined to the undersides of the trailing portions of the table in the same fashion as is defined for the plates 1130. The two sets of plates 1130 and 1134 are coupled together by connector links 1138 and any suitable means may be employed to control and affix the positions of the plates 1130 and 1134 to correspondingly raise and lower the trailing portions 1126 of the tables 1100 and 1102, the forward portions thereof, in view of the hinge connection at 1124, accommodating for this action while at the same time still providing proper discharge onto the transfer conveyor system 124.

FIG. 30 illustrates diagrammatically the electrical circuitry associated with the present invention. Thus, in this figure, three main electrical leads 1200, 1202 and 1204 are shown, the former two of which are controlled by a main switch assembly indicated generally by the reference character 1206. In series with the conductor 1208 are the aforementioned missing egg detector switches 653, the double egg detector switch 644 and pairs of parallel switches as indicated generally by the reference characters 1210 and 1212. This conductor 1208, after passing through the several switch means as aforementioned, is connected to the winding 1214 of a relay assembly indicated generally by the reference character 1216 and thence back through the conductor 1218 to the main line conductor 1202 previously mentioned. Thus, it will be apparent that the relay 1216 will be actuated only when all of the switches 653, the switch 644 and one or the other of the pair of switches in the mechanisms 1210 and 1212 are closed. When the circuit is complete as aforesaid, the conductor 1220 is connected to the main line so that the spreader motor 372, and the clutch device 150 previously described, will be energized so that the accumulator conveyor 104 continues to operate as does the plow assembly and the spreader device. If, on the other hand, the star wheel switches 510 are closed, the clutch assembly 171 is also energized so as to operate the container conveyor mechanism, the packer means 116, the transport means 118, the orientor means 112 and the star wheel 106.

The switches 653, 644, 1210 and 1212 are for the detection of abnormalities in the system and any one of which is effective to deenergize the relay 1216 and disable the circuitry to the clutch means 150 and 171 as well as to the spreader motor 372. However, if no abnormalities exist in the system, the spreader motor 372 will operate as will the clutch 150 to drive the accumulator conveyor 104 and, consequently, the plow frame assembly. Then, when the star wheel device is satisfied, the switches 510 will be closed to operate the remainder of the packing device. As has been mentioned hereinbefore, when there is a sufficient feed of eggs to the accumulator means 102, the star wheel switches 510 and/or the associated breaker points 528 will keep the circuitry to the clutch 171 continuously closed so that there is no interruption in the operation of a mechanism controlled by such clutch 171. The mechanism 1212 may be located at a convenient position on the main conveyor mechanism whereas the mechanism 1210 is associated with the container conveyor mechanism and detects the absence of a container or carton being placed upon such mechanism at the right-hand side thereof in FIG. 2.

The packing mechanism according to the present invention more than doubles the speed of prior art devices of this nature and it is for this reason that it is possible to provide an infeed to such packing mechanisms from two grading assemblies as is shown in FIG. 1. Thus, for the two grading assemblies shown in FIG. 1, it is necessary in accordance with the present invention to provide only four packers instead of eight according to prior art techniques. This of course is a saving in both equipment and space and, further, reduces the number of operators required to tend the machine's system.

The packer means according to the present invention constitutes a material improvement inasmuch as the arrangement provided eliminates the necessity for rapidly moving components such as would impart an undue linear velocity to the eggs in order to achieve increased capacity as has been obtained with the present invention.

Likewise, the transmission assembly is of particular note inasmuch as a single drive source, the motor 160, is utilized to drive substantially the entirety of the mechanism involved, with the exception of the accumulator conveyor 104 and the plow means associated therewith. This arrangement also permits the infeed of eggs to continue to the accumulator means and ride up to the star wheel device so that in the event difficulty does arise and an abnormality develops in operation of the system, there is no hesitation or delay before the star wheel device is again operative to keep the machine running once the difficulty is removed and resumption of the mechanism is attained. This is very important inasmuch as it prevents "backing up" to the extent that the grading mechanisms and associated assemblies will be required to shut down.

It is to be understood that certain changes and modifications as illustrated and described may be made without departing from the spirit of the invention or the scope of the following claims.

I claim:

1. In an article handling machine, in combination, accumulator means for receiving articles in random fashion, separating them into a row containing a predetermined number of articles, and advancing such row,
a container conveyor disposed below said accumulator means for supporting article containers,
packer means adapted to receive rows of articles and deposit them in containers supported by said container conveyor,
article orienting means bridging between said accumulator means and said packer means,
and common drive means for said accumulator means, said container conveyor, said packer means and said article orienting means for driving such entities in synchronism, and including mechanism periodically driving said container conveyor at a rate faster than its synchronous rate.

2. In an article handling machine, in combination,
a star wheel device having a plurality of article-receiving pockets,
an accumulator conveyor leading to said star wheel device for discharging articles to said pockets,
a plurality of plow members forming channels at said pockets,
means for driving said star wheel device only when all the pockets thereof are filled with articles to thereby advance a row of articles,
a container conveyor adapted to support containers thereon,
packer means adapted to receive rows of articles formed by said star wheel device and deposit them in containers on said container conveyor,
drive means for simultaneously driving said accumulator conveyor, vertically reciprocating said plow members, driving said container conveyor, and driving said packer means,
and means responsive to abnormality of any row of articles or of abnormality at said container conveyor to disable both said drive means and said means for driving the star wheel device.

3. In an article handling machine, in combination,
a star wheel device having a plurality of article-receiving pockets,
an accumulator conveyor leading to said star wheel device for discharging articles to said pockets,
an infeed conveyor discharging to said accumulator conveyor,
means for driving said infeed conveyor,
a plurality of plow members forming channels at said pockets,
means for driving said star wheel device only when all the pockets thereof are filled with articles to thereby advance a row of articles,
a container conveyor adapted to support containers thereon,
packer means adapted to receive rows of articles formed by said star wheel device and deposit them in containers on said container conveyor,
drive means for simultaneously driving said accumulator conveyor, vertically reciprocating said plow members, driving said container conveyor, and driving said packer means,
and means responsive to abnormality of any row of articles or of abnormality at said container conveyor to disable both said drive means and said means for driving the star wheel device.

4. In an article handling machine, in combination,
accumulator means including a conveyor and a device fed by said conveyor, said device presenting a row of pockets for receiving articles,
an infeed conveyor discharging to the accumulator conveyor,
means for advancing a row of articles only when all of the pockets of said device are filled,
plow means for agitating articles on the accumulator conveyor adjacent said pockets,
a container conveyor adapted to support containers thereon,
packer means adapted to receive rows of articles from said accumulator means and deposit them in containers on said container conveyor,
drive means for simultaneously driving said accumulator conveyor, said plow means, said container conveyor and said packer means independently of said infeed conveyor,
means for disabling said drive means in response to abnormality in machine operation,
and means limiting feed pressure of said infeed conveyor to said accumulator means in the event said accumulator conveyor becomes filled with articles.

5. In an article handling machine, in combination,
accumulator means including a conveyor and a device fed by said conveyor, said device presenting a row of pockets for receiving articles,
an infeed conveyor discharging to the accumulator conveyor,
means for actuating said device to advance a row of articles only when all of the pockets of said device are filled,
a container conveyor adapted to support containers thereon,
packer means adapted to receive rows of articles from said accumulator means and deposit them in containers on said container conveyor, drive means for simultaneously driving said accumulator means, said container conveyor and said packer means independently of said infeed conveyor, means for disabling said drive means in response to abnormality in machine operation, and means limiting feed pressure of said infeed conveyor to said accumulator means in the event said accumulator conveyor becomes filled with articles.

6. In an article handling machine, in combination, accumulator means for receiving articles in random, separating them in a row containing a predetermined number of articles, and advancing such row, a container conveyor disposed below said accumulator means for supporting article containers, packer means adapted to receive rows of articles and deposit them in containers supported by said container conveyor, article orienting means bridging between said accumulator means and said packer means, and common drive means for said accumulator means, said container conveyor, said packer means and said article orienting means for driving such entities in synchronism, and including mechanism periodically driving said container conveyor at a rate faster than its synchronous rate, said article orienting means including walls defining channels for individual articles of a row in which the walls are spaced apart remote from the packer means by amounts greater than the lengths of articles being handled, and in which said walls defining the channels are funneled adjacent said packer means, and said article orienting means also including a plate and a roller spaced therefrom for supporting each row of articles and means for rotating said rollers when the rows are remote from said packer means, whereby avoid articles will engage the walls with their smaller ends before reaching the funneled regions so that avoid articles will be discharged large end first to said packer means.

7. In an article handling machine, in combination, accumulator means for receiving articles in random fashion, separating them in a row containing a predetermined number of articles, and advancing such row, an infeed conveyor for delivering articles to said accumulator means, a container conveyor disposed below said accumulator means for supporting article containers, packer means adapted to receive rows of articles and deposit them in containers supported by said container conveyor, article orienting means bridging between said accumulator means and said packer means, common drive means for said accumulator means, said container conveyor, said packer means, and said article orienting means for driving such entities in synchronism, and including mechanism periodically driving said container conveyor at a rate faster than its synchronous rate, and drive means for said infeed conveyor for continuous operation independent of said common drive means.

8. In a machine for handling articles in transversely aligned groups, a station at which articles are separated into and advanced in such groups, conveyor means for positively advancing and feeding articles to said station at a rate which may be faster than that rate at which the articles are being advanced from the station, and means cooperative with said conveyor means to limit the feed pressure of articles being positively advanced by the conveyor means, regardless of disparity in articles flow rate as aforesaid including deflector means over said conveyor means shaped to deflect excess articles laterally, and reversely operating conveyor means receiving the deflected articles for recirculation.

9. In a machine for handling articles in transversely aligned groups, a station at which articles are separated into and advanced in such groups, conveyor means for positively advancing and feeding articles to said station at a rate which may be faster than that rate at which the articles are being advanced from the station, said conveyor means including an accumulator portion adjacent to and feeding directly to the station and an infeed portion feeding to said accumulator portion, and means cooperative with said conveyor means to limit the feed pressure of articles being positively advanced by the conveyor means, regardless of disparity in article flow rate as aforesaid including deflector means over said conveyor means shaped to deflect excess articles laterally, and reversely operating conveyor means receiving the deflected articles for recirculation.

10. In a machine for handling articles in transversely aligned groups, a station at which articles are separated into and advanced in such groups, conveyor means for positively advancing and feeding articles to said station at a rate which may be faster than that rate at which the articles are being advanced from the station, said conveyor means including an accumulator portion adjacent to and feeding directly to the station and an infeed portion feeding to said accumulator portion, and means constricting the flow path over said infeed portion adjacent said accumulator portion to limit the feed pressure of articles being positively advanced by the conveyor means, regardless of disparity in article flow rate as aforesaid including article deflector means shaped and positioned to deflect articles laterally from said conveyor means.

11. An article handling machine comprising, in combination, a feed device adapted to receive and be filled by a plurality of articles in a transverse row, means for discriminating between filled and unfilled conditions of said feed device and for actuating the later when filled to advance a row of articles, a conveyor belt adjacent said feed device and having a width corresponding to the length of said transverse row for substantially uniform feed to said feed device, an infeed conveyor adjacent said conveyor belt for feeding articles thereto, drive means for said feed device, said conveyor belt and said infeed conveyor, and including mechanism responsive to the presence of an excess of articles on said feed device or conveyor belt for interrupting drive to said feed device and said conveyor belt while continuing drive to said infeed conveyor, and choke means constricting the effective width of said infeed conveyor adjacent that end thereof discharging to said conveyor belt.

12. In an article handling machine, in combination, a feed device adapted to receive and be filled by a plurality of articles arranged in a transverse row, means for actuating said feed device to advance a row of articles in response to said device being filled, a conveyor belt disposed to feed articles to said feed device, an infeed conveyor disposed to feed articles to said conveyor belt at a rate which may be greater than the rate of advancement from said feed device, choke means including an oscillatory wedge shaped means disposed adjacent the discharge end of said infeed conveyor to blank off a portion thereof and induce articles to be deflected laterally from the sides of the infeed conveyor adjacent the discharge end thereof in response to a condition in which articles fill the area between said feed device and said choke means, and recirculating conveyor means for moving articles so deflected back toward the inlet end of said infeed conveyor.

13. In an article handling machine, in combination,
a feed device adapted to receive and be filled by a plurality of articles arranged in a transverse row,
means for actuating said feed device to advance a row of articles in response to said device being filled,
a conveyor belt disposed to feed articles to said feed device,
an infeed conveyor disposed to feed articles to said conveyor belt at a rate which may be greater than the rate of advancement from said feed device,
choke means disposed adjacent the discharge end of said infeed conveyor to blank off a portion thereof and induce articles to be deflected laterally from the sides of the infeed conveyor adjacent the discharge end thereof in response to a condition in which articles fill the area between said feed device and said choke means,
an oscillatory spreader device for sweeping back and forth at the inlet end of said conveyor belt behind said choke means to distribute articles transversely along the length of said feed device,
and recirculating conveyor means for moving articles so deflected back toward the inlet end of said infeed conveyor.

14. In an article handling machine, in combination,
a star wheel device presenting a plurality of transversely aligned pockets for receiving a plurality of articles and advancing them in a row,
means for discriminating between filled and unfilled conditions of said star wheel device and for actuating the latter when filled to advance a row of articles, said means comprising a normally open switch for each pocket adapted to be closed by an article received therein,
a normally closed cam operated switch in parallel with said normally open switches and actuated by movement of said star wheel device to orient the pockets thereof in the absence of articles to fill said pockets.

15. In an article handling machine, in combination,
a star wheel device presenting a plurality of transversely aligned pockets for receiving a plurality of articles and advancing them in a row,
means for discriminating between filled and unfilled conditions of said star wheel device and for actuating the latter when filled to advance a row of articles, said means comprising a normally open switch for each pocket adapted to be closed by an article received therein,
a normally closed cam operated switch in parallel with said normally open switches and actuated by movement of said star wheel device to orient the pockets thereof in the absence of articles to fill said pockets,
a conveyor belt adjacent said star wheel device and having a width to simultaneously feed all of said pockets,
an infeed conveyor adjacent said conveyor belt for feeding articles thereto,
means for selectively driving said star wheel device and said conveyor belt,
means for continuously driving said infeed conveyor independently of said star wheel device and said conveyor belt,
and means for limiting the infeed pressure of articles to said conveyor belt and star wheel device including deflector means over said conveyor means shaped to deflect excess articles laterally, and reversely operating conveyor means receiving the deflected articles for recirculation.

16. In an article handling machine, in combination,
accumulator means for receiving articles in random fashion and advancing them in rows containing a predetermined number of articles,
a container conveyor assembly for supporting containers adapted to be row-filled with articles,
and packer means for receiving rows of articles and depositing them in containers carried by the container conveyor,
said packer means comprising a pair of spaced endless chain members having down flight portions extending from an article-receiving position to an article-discharging position and up flight portions extending from the article-discharge position to the article-receiving position, a plurality of frames pivotally carried between said chain members, each frame including a pair of complemental sections having cooperable elements defining a row of article-receiving cages, said sections of each frame being relatively pivotable to open and close said cages, spring means normally urging said sections of each frame to cage closed position, cam means engaging one of said sections of each frame and positioned to control angular disposition of said cages for article reception and discharge, and cam means engaging the other of said sections of each pair to shift said cages to open condition at said article-receiving and said article-discharge positions.

17. In an article handling machine, in combination,
accumulator means adapted to receive articles in random fashion and position them in a row containing a predetermined number of articles,
orientor means adjacent said accumulator means and adapted to receive rows of articles therefrom,
means at the opposite end of said orientor means for channeling articles lengthwise,
container conveyor means beneath said channeling means,
and packer means adapted to receive a row of lengthwise oriented articles and transfer them to a container carried by said container conveyor,
said packer means comprising a plurality of frames, means pivotally carrying said frames and describing a closed path between said opposite end of said orientor means and said container conveyor means, each frame including a pair of sections, one of which is resiliently urged rotationally with respect to said means carrying the frames and the other being resiliently urged rotationally with respect to said one section, each section carrying a series of laterally projecting fingers which, under the action of said resilient means urging the sections together, define a series of article receiving cages, cam means engaging said one section of each frame to control the angular position of the fingers thereon continuously throughout the motion path of said frames, cam means engaging the other section of each frame to oppose the resilient means urging such sections together as aforesaid to control opening and closing of said cages.

18. In an article handling machine, in combination,
accumulator means adapted to receive articles in random fashion and position them in a row containing a predetermined number of articles,
orientor means adjacent said accumulator means and adapted to receive rows of articles therefrom,
means at the opposite end of said orientor means for channeling articles lengthwise,
container conveyor means beneath said channeling means,
and packer means adapted to receive a row of lengthwise oriented articles and transfer them to a container carried by said container conveyor, said packer means comprising a plurality of frames, means pivotally carrying said frames and describing a closed path between said opposite end of said orientor means and said container conveyor means, each frame including a pair of sections, one of which is resiliently urged rotationally with respect to said means carrying the frames and the other being resiliently urged rotationally with respect to said one section, each section carrying a series of laterally projecting fingers which, under the action of said resilient means urging the sections together, define a series of article receiving cages, cam means engaging said one section of each frame to control the angular position of the frames continuously throughout the motion path of said frames, cam means engaging the other section of each frame to oppose the resilient means urging such sections together as aforesaid to control opening and closing of said cages, the first mentioned cam means having a portion adjacent the discharge portion of the frames immediately above the container conveyor means to control the angularity of said frames and clear containers disposed thereunder.

19. In an article handling machine, in combination, accumulator means adapted to receive articles in random fashion and position them in a row containing a predetermined number of articles, orientor means adjacent said accumulator means and adapted to receive rows of articles therefrom, means at the opposite end of said orientor means for channeling articles lengthwise, container conveyor means beneath said channeling means, and packer means adapted to receive a row of lengthwise oriented articles and transfer them to a container carried by said container conveyor, said packer means comprising a plurality of frames, means pivotally carrying said frame and describing a closed path between said opposite end of said orientor means and said container conveyor means, each frame including a pair of sections, one of which is resiliently urged rotationally with respect to said means carrying the frames and the other being resiliently urged rotationally with respect to said one section, each section carrying a series of laterally projecting fingers which, under the action of said resilient means urging the sections together, define a series of article receiving cages, cam means engaging said one section of each frame to control the angular position of the fingers theeron continuously throughout the motion path of said frames, cam means engaging the other section of each frame to oppose the resilient means urging such sections together as aforesaid to control opening and closing of said cages, the second mentioned cam means having operable portions adjacent said opposite end of said orientor means, adjacent said container conveyor means, and having an operable portion on the down flight between the orientor means and the container conveyor means to momentarily move said fingers toward cage open position at which point such fingers are disposed substantially horizontally.

20. In an article handling device, a container conveyor adapted to support containers at spaced intervals therealong, a packer adapted to deposit rows of articles in containers supported by said container conveyor, and transmission means for driving said container conveyor and said packer in timed relation, said transmission means having a pair of output shafts, one connected to said packer and the other connected to said container conveyor, and including means normally driving said shafts in synchronism and other alternative drive means intermittently driving said other shaft at a faster speed than its synchronous speed on a controlled timed basis.

21. In an article handling machine, infeed conveyor means, accumulator means for (a) receiving articles from said infeed conveyor means, (b) gathering the articles in transverse rows containing a predetermined number of articles, and (c) advancing articles in such row form, container conveyor means disposed below the level of said accumulator means, packer means for receiving rows or articles from said accumulator means and depositing them in containers supported on said container conveyor means, and transmission means for driving said accumulator means, said packer means and said container conveyor means in timed relation, said transmission means having a main drive shaft connected to said accumulator means and said packer means and an auxiliary shaft connected to said container conveyor means, first means driving said auxiliary shaft from said main shaft at one rotational speed, and second means intermittently driving said auxiliary shaft from said main shaft at a rotational speed greater than said one rotational speed.

22. In an article handling device, a container conveyor adapted to support containers at spaced intervals therealong, a packer adapted to deposit rows of articles in containers supported by said container conveyor, and transmission means for driving said container conveyor and said packer in timed relation, said transmission means having a pair of output shafts, one connected to said packer and the other connected to said container conveyor, a gear journalled on said other shaft, a one-way clutch connecting said gear to said other shaft, gear means connected to said one shaft for driving said gear on the other shaft whereby the two shafts are normally driven in synchronism, an eccentric on said one shaft, a ratchet on said other shaft, a pawl assembly journalled on said eccentric and engageable with said ratchet, said pawl and ratchet being constructed to periodically engage and overrun said one-way clutch.

23. In an article handling device, a container conveyor adapted to support containers at spaced intervals therealong, a packer adapted to deposit rows of articles in containers supported by said container conveyor, and transmission means for driving said container conveyor and said packer in timed relation, said transmission means having a pair of output shafts, one connected to said packer and the other connected to said container conveyor, and including first means normally driving said shafts in synchronism and second means intermittently driving said other shaft at a faster speed than its synchronous speed, said first means comprising a gear train connecting said output shafts and including an overrunning clutch assembly, and said second means comprising an eccentric rotating with said one shaft, a connecting rod journalled on said eccentric, a ratchet rotating with the other shaft, and a pawl mechanism actuated by said connecting rod and engageable with said ratchet.

24. In an article handling machine, infeed conveyor means, accumulator means for (a) receiving articles from said infeed conveyor means, (b) gathering the articles in transverse rows containing a predetermined number of articles, and (c) advancing articles in such row form, container conveyor means disposed below the level of said accumulator means, packer means for receiving rows of articles from said accumulator means and depositing them in containers supported on said container conveyor means, and transmission means for driving said accumulator means, said packer means and said container conveyor means in timed relation, said transmission means having a main drive shaft connected to said accumulator means and said packer means and an auxiliary shaft connected to said container conveyor means, first means driving said auxiliary shaft from said main shaft at one rotational speed, and second means intermittently driving said auxiliary shaft from said main shaft at a rotational speed greater than said one rotational speed, said first means comprising a gear train connecting said output shafts and including an overrunning clutch assembly, and said second means comprising an eccentric rotating with said one shaft, a connecting rod journalled on said eccentric, a ratchet rotating with the other shaft, and a pawl mechanism actuated by said connecting rod and engageable with said ratchet.

25. In an article handling device, a container conveyor adapted to support containers at spaced intervals therealong, a packer adapted to deposit rows of articles in containers supported by said container conveyor, and transmission means for driving said container conveyor and said packer in timed relation, said transmission means having a pair of output shafts, one connected to said packer and the other connected to said container conveyor, a gear journalled on said other shaft, a one-way clutch connecting said gear to said other shaft, gear means connected to said one shaft for driving said gear on the other shaft whereby the two shafts are normally driven in synchronism, an eccentric on said one shaft, a ratchet on said other shaft, a pawl assembly journalled on said eccentric and engageable with said ratchet, said pawl and ratchet being constructed to periodically engage and overrun said one-way clutch, and a connecting rod journalled on said eccentric and connected to said pawl assembly.

26. In an article handling device, a container conveyor adapted to support containers at spaced intervals therealong, a packer adapted to deposit rows of articles in containers supported by said container conveyor, and transmission means for driving said container conveyor and said packer in timed relation, said transmission means including a pair of output shafts, one connected to said packer and the other connected to said container conveyor, means for driving said one output shaft, said transmission means also including a gear train, including an overrunning clutch, driving said other output shaft from said one output shaft, an eccentric rotating with said one shaft, a connecting rod journalled on said eccentric, a ratchet rotating with said other shaft, a pawl assembly carried by said other shaft and oscillated by said connecting rod to intermittently rotate said other shaft at a speed which is faster than the speed imparted thereto by said gear train, a pair of eccentrics rotating with said one shaft and displaced 180° from each other, a second ratchet on said other shaft, a pair of pawl assemblies carried by said other shaft and engageable with said second ratchet, a pair of connecting rods journalled on said pair of eccentrics and connected to respective ones of said pair of pawl assemblies, means for alternatively disabling the first mentioned pawl assembly and said pair of pawl assemblies, the eccentricity of said first mentioned pawl assembly being greater than the eccentricities of said pair of eccentrics whereby the accelerated drives imparted to said other shaft are cyclically different with respect to angular rotation of said one shaft.

27. In an article handling machine, in combination, accumulator means for receiving random articles and advancing them in rows containing a predetermined number of articles, a container conveyor assembly for supporting containers adapted to be row-filled with articles, and packer means comprising endless recirculatory members with a plurality of frames thereon, each frame adapted to handle a row of articles, each frame including a pair of complemental members pivotally secured together and each having a row of laterally projecting fingers defining article-receiving cages therebetween, there being one cage for each article in a row, means for moving said frames in closed paths between an article-receiving position and an article-discharging position, first cam means for controlling the angular disposition of said cages for article reception and discharge, and second cam means for controlling the relative pivoting of said members to open said cages at article reception and article discharge positions of the packer means.

28. In an article handling machine, in combination, accumulator means for receiving random articles and advancing them in rows containing a predetermined number of articles, a container conveyor assembly for supporting containers adapted to be row-filled with articles, and packer means for receiving rows of articles and depositing them in containers carried by the container conveyor, said packer means comprising a pair of spaced endless chain members having down flight portions extending from an article-receiving position to an article-discharging position and up flight portions extending from the article-discharge position to the article-receiving position, a plurality of frames pivotally carried between said chain members, each frame including a pair of complemental sections having laterally projecting fingers in which cooperable pairs of fingers on the sections define a row of article-receiving cages, said sections of each frame being relatively pivotable to open and close said cages, spring means normally urging said sections of each frame to cage closed position, cam means engaging one of said sections of each frame to control the angular disposition of said cages with respect to said chain member, and cam means engaging the other of said sections of each pair to present said cages in open condition at said article-receiving and said article-discharge positions.

29. In an article handling machine, packer means adapted to receive a row of lengthwise oriented articles at one position and transfer them to a container at another position, said packer means comprising a plurality of frames, means pivotally carrying said frames and describing a closed path between said positions, each frame including a pair of sections, one of which is resiliently urged rotationally with respect to said means carrying the frames and the other being resiliently urged rotationally to said one section, each section carrying a series of laterally projecting fingers which, under the action of said resilient means urging the sections together, define a row of article receiving cages, cam means engaging said one section of each frame to control the angular position of the fingers thereon continuously throughout the motion path of said frames, cam means engaging the other section of each frame to oppose the resilient means urging such sections together as aforesaid to control opening and closing of said cages.

30. In an article handling machine, packer means adapted to receive a row of lengthwise oriented articles at one position and transfer them to a container at another position, said packer means comprising a plurality of frames, means pivotally carrying said frames and describing a closed path between said positions, each frame including a pair of sections, one of which is resiliently urged rotationally with respect to said means carrying the frames and the other being resiliently urged rotationally with respect to said one section, each section carrying a series of laterally projecting fingers which, under the action of said resilient means urging the sections together, define a series of article receiving cages, cam means engaging said one section of each frame to control the angular position of the fingers thereon continuously throughout the motion path of said frames, cam means engaging the other section of each frame to oppose the resilient means urging such sections together as aforesaid to control opening and closing of said cages.

31. In an article handling machine,
packer means adapted to receive a row of lengthwise oriented articles at a first position and transfer them to a container at a second position,
said packer means comprising a plurality of frames, means pivotally carrying said frames and describing a closed path between said first and second positions, each frame including a pair of sections, one of which is resiliently urged rotationally with respect to said means carrying the frames and the other being resiliently urged rotationally with respect to said one section, each section carrying a series of laterally projecting fingers which, under the action of said resilient means urging the sections together, define a series of article receiving cages, cam means engaging said one section of each frame to control the angular position of the fingers thereon continuously throughout the motion path of said frames, cam means engaging the other section of each frame to oppose the resilient means urging such sections together as aforesaid to control opening and closing of said cages,
the second mentioned cam means having operable portions adjacent said first and second positions having an operable portion on the down flight between such positions to momentarily move said fingers toward cage open position and at which point such fingers are disposed substantially horizontally.

32. In an article handling machine, in combination,
accumulator means for receiving a random mass of eggs, aligning them in transverse rows containing a predetermined number of eggs, and advancing such rows of eggs,
an infeed conveyor assembly feeding said accumulator means,
said infeed conveyor including a main conveyor belt running in a direction to feed eggs to said accumulator means and a pair of reversely running conveyor belts on opposite sides of said main conveyor belt,
said accumulator means including an accumulator conveyor belt of a width corresponding to the cumulative width of said main conveyor belt and the reversely running conveyor belts of said infeed conveyor,
a pair of choke plates, one extending transversely of said infeed conveyor adjacent the juncture between each reversely running belt thereof and said accumulator conveyor belt, and each being of a transverse width corresponding to the width of its associated reversely running belt,
and a V-shaped choke wedge positioned upstream of said choke plates and substantially centrally disposed over said main conveyor belt to limit infeed pressure of eggs to said accumulator means.

33. In an article handling machine, in combination,
accumulator means for receiving a random mass of eggs, aligning them in transverse rows containing a predetermined number of eggs, and advancing such rows of eggs,
an infeed conveyor assembly feeding said accumulator means,
said infeed conveyor including a main conveyor belt running in a direction to feed eggs to said accumulator means and a pair of reversely running conveyor belts on opposite sides of said main conveyor belt,
said accumulator means including an accumulator conveyor belt of a width corresponding to the cumulative width of said main conveyor belt and the reversely running conveyor belts of said infeed conveyor,
a pair of choke plates, one extending transversely of said infeed conveyor adjacent the juncture between each reversely running belt thereof and said accumulator conveyor belt, and each being of a transverse width corresponding to the width of its associated reversely running belt,
a V-shaped choke wedge positioned upstream of said choke plates and substantially centrally disposed over said main conveyor belt to limit infeed pressure of eggs to said accumlator means,
a Y-shaped spreader disposed beneath said wedge, and means for oscillating said spreader,
said spreader having its divergent legs extending divergently from a point downstream of said wedge and extending into overlapping relation above said accumulator conveyor belt, and having its stem extending to a point upstream of said wedge.

34. In an egg handling machine,
an endless conveyor assembly comprising a series of longitudinally spaced rollers and a series of support strips, one adjacent each roller, and flexible means carrying the rollers and strips,
wall means above said conveyor assembly defining a series of side-by-side channels along the length of said conveyor assembly, said wall means having first portions spaced apart distances exceeding the lengths of eggs to be handled and second portions converging to a plurality of stations spaced apart by distances not substantially greater than the widths of eggs to be handled,
means for rotating said rollers as they are moved along below the first portions of said wall means, whereby eggs will engage the wall means with their smaller ends while spacing their larger ends therefrom, and egg turning fingers extending convergently inwardly from the wall means defining each channel adjacent the end of the first portion of the wall means.

35. In a machine for handling articles in transversely aligned groups,
a station at which articles are separated into and advanced in such groups and controlled to advance articles only when a predetermined number of articles are aligned,
elongated conveyor means for positively advancing and feeding articles to said station at a rate which may be faster than that rate at which the articles are being advanced from the station,
said station being at the linear end of said elongated conveyor means for directly receiving articles therefrom,
oscillatory choke means generally over said conveyor means adjacent to but upstream of said station, for blocking off a portion of the flow path to said station at a region upstream therefrom,
said conveyor means including a pair of reversely running belts spaced laterally from said region and extending upstream therefrom, for receiving and recirculating excess articles.

36. In an article handling machine, in combination,
accumulator means for receiving random articles, separating them in a row containing a predetermined number of articles, and advancing such row, a container conveyor disposed below said accumulator means for supporting article containers, packer means adapted to receive rows of articles and deposit them in containers supported by said container conveyor, article orienting means bridging between said accumulater means and said packer means, said article orienting means including walls defining channels for individual articles of a row in which the walls are spaced apart remote from the packer means by amounts greater than the lengths of articles being handled, and in which said walls defining the channels are funneled adjacent said packer means, and said article orienting means also including a roller for supporting each row of articles and means for rotating said rollers when the rows are remote from said packer means, whereby ovoid articles will engage the walls with their smaller ends before reaching the funneled regions so that ovoid articles will be discharged large end first to said packer means.

37. In an article handling machine, in combination, accumulator means for receiving random articles, separating them in a row containing a predetermined number of articles, and advancing such row, a container conveyor disposed below said accumulator means for supporting article containers, packer means adapted to receive rows of articles and deposit them in containers supported by said container conveyor, article orienting means bridging between said accumulator means and said packer means, said article orienting means including walls defining channels for individual articles of a row in which the walls are spaced apart remote from the packer means by amounts greater than the lengths of articles being handled, and in which said walls defining the channels are funneled adjacent said packer means, and said article orienting means also including a roller for supporting each row of articles and means for rotating said rollers when the rows are remote from said packer means, whereby ovoid articles will engage the walls with their smaller ends before reaching the funneled regions so that ovoid articles will be discharged large end first to said packer means, and advancing means disposed at the packer means end of said article orienting means to cyclically advance rows of articles to said packer means.

38. In an article handling machine, in combination, a star wheel device having a plurality of article-receiving pockets, a plurality of plow members forming channels at said pockets, an accumulator conveyor leading to said star wheel device for discharging articles to said pockets, means for driving said star wheel device only when all the pockets thereof are filled with articles to thereby advance a full row of articles, an infeed conveyor discharging articles to said accumulator conveyor centrally thereof, and return conveyors along the opposite sides of said infeed conveyor, the cumulative widths of said infeed and return conveyor being substantially equal to the width of said accumulator conveyor, a divider wedge disposed substantially intermediate the opposite sides of said infeed conveyor and spaced upstream of the discharge end thereof, a pair of choke plates overlying said return conveyors adjacent the accumulator conveyor, said choke plates being fixedly mounted to said plow members and provided with ledge portions projecting horizontally downstream thereof, and means for vertically reciprocating said plow members and said choke plates.

39. Egg handling apparatus, comprising: an egg conveyor assembly including a series of longitudinally spaced rollers; means for advancing said rollers along said conveyor assembly, and means for rotating said rollers during advancement thereof; lateral egg retention means defining at least one channel along said conveyor assembly, including egg retaining portions spaced apart distances exceeding the lengths of eggs to be handled, whereby eggs rotated by said rollers shift along the rollers to engage the lateral retention means with their smaller ends while spacing the larger ends therefrom; and egg turning fingers converging from said lateral retention means and defining a narrow egg passage to cause all eggs to be oriented longitudinally and large end forward.

40. Egg handling apparatus, comprising: an egg conveyor assembly including a series of longitudinally spaced rollers; means for advancing said rollers along said conveyor assembly, and means for rotating said roller during advancement thereof; lateral egg retention means defining a plurality of egg retention channels along said conveyor assembly, each including egg retaining portions spaced apart distances exceeding the lengths of eggs to be handled, whereby eggs rotated by said rollers shift along the rollers to engage the lateral retention means with their smaller ends while spacing the larger ends therefrom; and egg turning means on the ends of each of said channels to cause all eggs to be oriented longitudinally and alike, with their longitudinal axes parallel.

41. The apparatus in claim 40 wherein said egg turning means each comprises a pair of converging elements positioned to abut the smaller ends to turn the larger end forwardly.

References Cited

UNITED STATES PATENTS

| 2,717,729 | 9/1955 | Page et al. | 53—160 |
|---|---|---|---|
| 3,104,753 | 9/1963 | Osborne | 198—30 |
| 3,169,354 | 2/1965 | Bliss et al. | 53—61 |
| 3,232,411 | 2/1966 | Kulig | 198—33 |

TRAVIS S. McGEHEE, *Primary Examiner.*

FRANK E. BAILEY, *Examiner.*

UNITED STATES PATENT OFFICE
CERTIFICATE OF CORRECTION

Patent No. 3,342,012                              September 19, 1967

Walter J. Reading

It is hereby certified that error appears in the above numbered patent requiring correction and that the said Letters Patent should read as corrected below.

Column 3, line 60, before "infeed" insert -- exception of the --; line 67, for "poerate" read -- operate --; column 4, line 27, for "elevation" read -- elevational --; line 35, for "accumulation" read -- accumulator --; line 60, for "elevation" read -- elevational --; column 7, line 21, for "readilly" read -- readily --; column 14, line 3, for "114" read -- 414 --; column 15, line 29, for "control" read -- controls --; line 39, for "space" read -- spaces --; column 17, line 41, for "spring" read -- springs --; column 21, line 17, for "and" read -- or --; column 25, line 38, for "avoid" read -- ovoid --; column 26, line 1, for "articles" read -- article --; line 49, for "later" read -- latter --; column 29, line 41, for "frame" read -- frames --; column 30, line 3, for "alternative" read -- alternate --; column 35, line 9, for "accumulater" read -- accumulator --.

Signed and sealed this 13th day of May 1969.

(SEAL)
Attest:

EDWARD M. FLETCHER, JR.
Attesting Officer

Commissioner of Patents